United States Patent
Peker et al.

(10) Patent No.: US 7,492,059 B2
(45) Date of Patent: Feb. 17, 2009

(54) HIGH POWER ARCHITECTURE FOR POWER OVER ETHERNET

(75) Inventors: Arkadiy Peker, New Hyde Park, NY (US); Dror Korcharz, Bat Yam (IL); Alon Ferentz, Bat Yam (IL); Yair Darshan, Petach Tikva (IL)

(73) Assignee: Microsemi Corp.—Analog Mixed Signal Group Ltd., Hod Hasharon (IL)

( * ) Notice: Subject to any disclaimer, the term of this patent is extended or adjusted under 35 U.S.C. 154(b) by 737 days.

(21) Appl. No.: 10/761,327

(22) Filed: Jan. 22, 2004

(65) Prior Publication Data

US 2005/0085212 A1 Apr. 21, 2005

Related U.S. Application Data

(60) Provisional application No. 60/512,362, filed on Oct. 16, 2003.

(51) Int. Cl.
*H02J 1/00* (2006.01)
(52) U.S. Cl. .......................................................... 307/71
(58) Field of Classification Search ................... 307/17, 307/71
See application file for complete search history.

(56) References Cited

U.S. PATENT DOCUMENTS

| | | | |
|---|---|---|---|
| 3,991,320 A | 11/1976 | Ross | |
| 4,028,559 A * | 6/1977 | Larner | 327/168 |
| 4,677,535 A * | 6/1987 | Kawabata et al. | 363/65 |
| 5,266,838 A | 11/1993 | Gerner | |
| 5,652,893 A | 7/1997 | Ben Meir | 395/750 |
| 5,834,925 A | 11/1998 | Chesavage | |
| 5,844,327 A | 12/1998 | Batson | |
| 5,914,585 A | 6/1999 | Grabon | |
| 6,009,000 A | 12/1999 | Siri | |

(Continued)

FOREIGN PATENT DOCUMENTS

WO PCT/IL2004/00916 1/2005

(Continued)

OTHER PUBLICATIONS

IEEE 802.3af-2003 Standard—Data Terminal Equipment Power via Media Dependent Interface.

(Continued)

*Primary Examiner*—Stephen W Jackson
*Assistant Examiner*—Dru M Parries
(74) *Attorney, Agent, or Firm*—Simon Kahn

(57) ABSTRACT

A combiner for use with a powered device having high power needs, the combiner comprising: a first power input adapted to receive a first power signal over a first set of wire pairs utilized to carry communication data; a second power input adapted to receive a second power signal over a second set of wire pairs, wherein the first power signal is combined with the second power signal to produce a combined high power signal; and a control circuit operable to sense the combined high power signal and to supply the combined high power signal to a powered device in response to the sensed combined high power signal. Also disclosed is a local area network adapted to supply power to powered devices over a plurality of paths utilizing the combiner, the local area network thus supplying high power to a powered device.

49 Claims, 14 Drawing Sheets

U.S. PATENT DOCUMENTS

| | | |
|---|---|---|
| 6,115,468 A | 9/2000 | De Nicolo |
| 6,121,693 A | 9/2000 | Rock |
| 6,153,946 A | 11/2000 | Koch et al. |
| 6,377,874 B1 | 4/2002 | Ykema |
| 6,473,608 B1 | 10/2002 | Lehr et al. |
| 6,535,983 B1 | 3/2003 | McCormack et al. |
| 6,628,011 B2 | 9/2003 | Droppo et al. |
| 6,643,566 B1 | 11/2003 | Lehr et al. |
| 6,665,404 B2 | 12/2003 | Cohen |
| 6,856,629 B1 * | 2/2005 | Parsi et al. .................. 370/535 |
| 6,894,457 B2 * | 5/2005 | Germagian et al. ......... 320/119 |
| 2002/0079962 A1 | 6/2002 | Sander |
| 2003/0099076 A1 * | 5/2003 | Elkayam et al. ............... 361/90 |
| 2003/0126377 A1 * | 7/2003 | Orenstien et al. ........... 711/146 |
| 2003/0141907 A1 | 7/2003 | Canova et al. |
| 2003/0218384 A1 * | 11/2003 | Yoneda ........................ 307/19 |
| 2004/0080962 A1 * | 4/2004 | Charych .................. 363/21.11 |
| 2005/0040785 A1 * | 2/2005 | Barnes et al. ............... 320/101 |

FOREIGN PATENT DOCUMENTS

WO PCT/IL2004/00916-ISR  1/2005

OTHER PUBLICATIONS

Written Opinion.

* cited by examiner

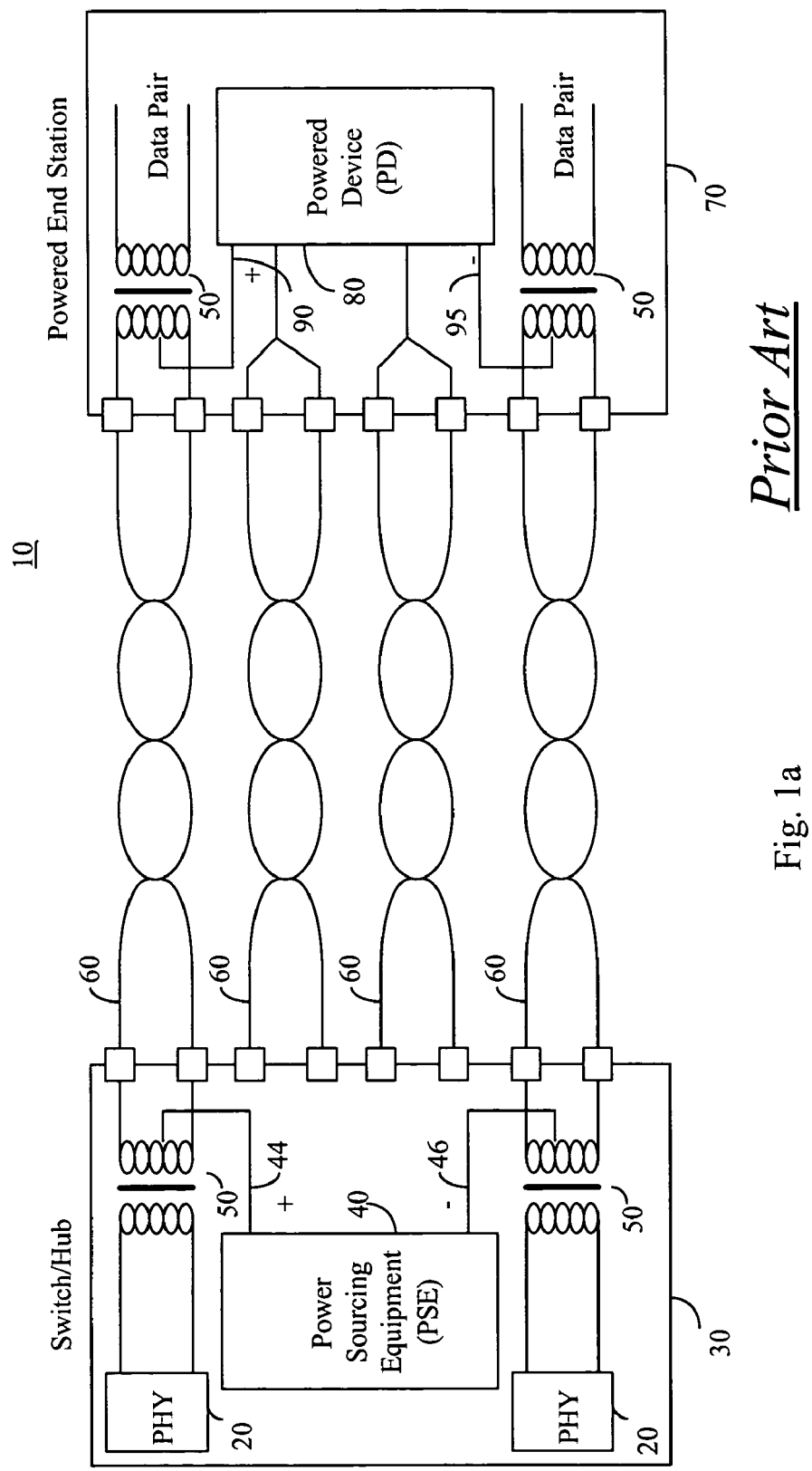
Fig. 1a  *Prior Art*

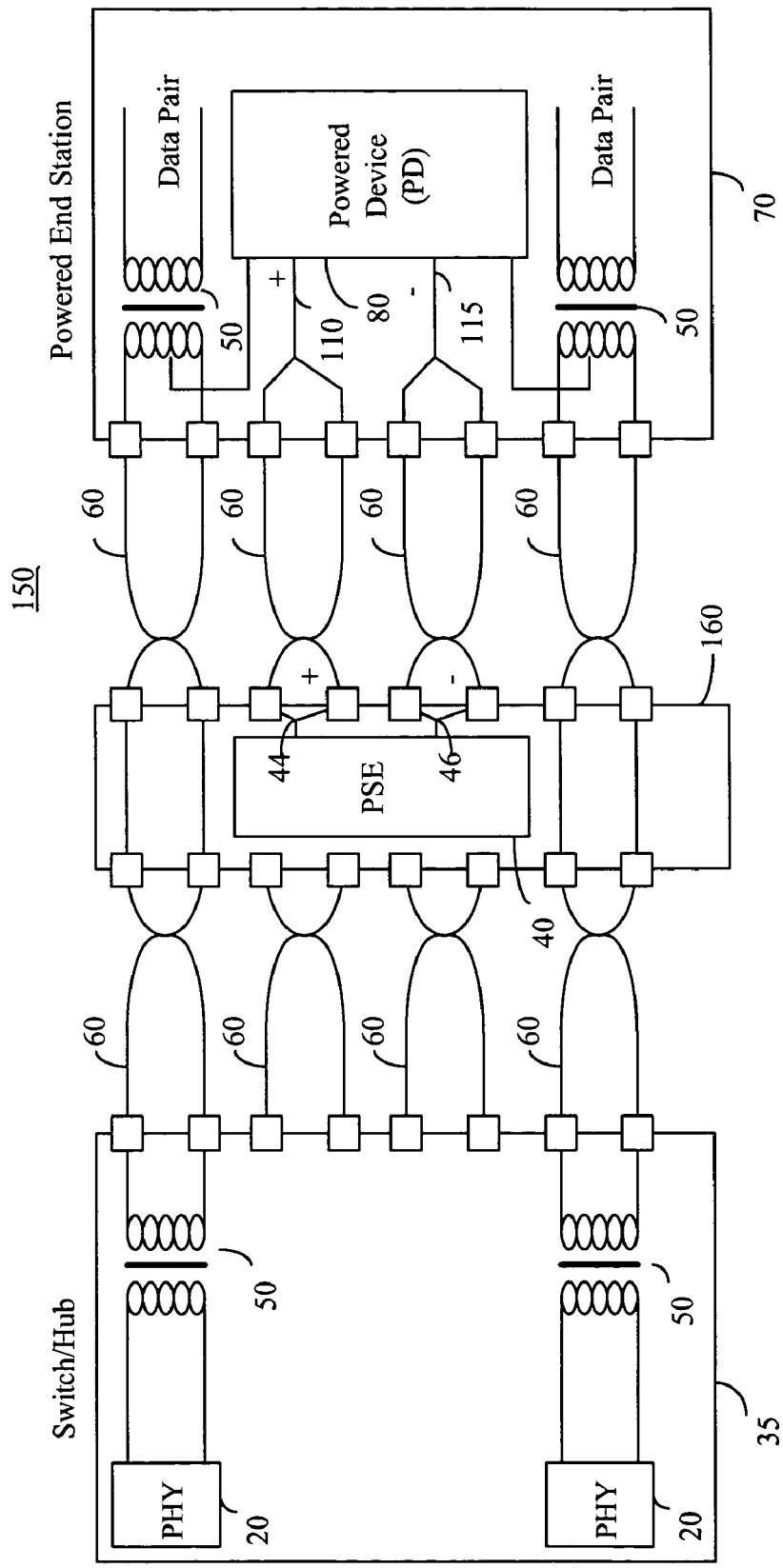
Fig. 1c  *Prior Art*

HIGH POWER ARCHITECTURE FOR POWER OVER ETHERNET

RELATED APPLICATIONS

This application claims priority from U.S. Provisional Patent Application Ser. No. 60/512,362 filed Oct. 16, 2003 entitled "POWERED DEVICE ASIC" the contents of which are incorporated herein by reference.

BACKGROUND OF THE INVENTION

The invention relates generally to the field of power over local area networks, particularly Ethernet based networks, and more particularly to an architecture enabling increased power for powered devices.

The growth of local and wide area networks based on Ethernet technology has been an important driver for cabling offices and homes with structured cabling systems having multiple twisted wire pairs. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to; reduced cost of installation; centralized power and power back-up; and centralized security and management.

The IEEE 802.3af-2003 standard, whose contents are incorporated herein by reference, is addressed to powering remote devices over an Ethernet based network. The above standard is limited to a powered device (PD) having a maximum power requirement during operation of 12.95 watts. Power can be delivered to the PD either directly from the switch/hub known as an endpoint power sourcing equipment (PSE) or alternatively via a midspan PSE. Unfortunately, no provision has been made in the above standard for PDs requiring power in excess of the above maximum power requirement. It is understood by those skilled in the art, that the above power limitation is primarily a function of the power carrying capabilities of the installed twisted wire pairs being utilized to deliver power.

Several patents addressed to the issue of supplying power to a PD over an Ethernet based network exist including: U.S. Pat. Ser. No. 6,473,608 issued to Lehr et al., whose contents are incorporated herein by reference; U.S. Pat. Ser. No. 6,643, 1066 issued to Lehr et al., whose contents are incorporated herein by reference; and U.S. Pat. Ser. No. 6,1110,468 issued to De Nicolo whose contents are incorporated herein by reference. Each of the above mentioned patents similarly observe the above power limitation, since this limitation is a function of the power carrying capabilities of the twisted wire pairs being utilized.

It would therefore be desirable to have an architecture enabling powering remote devices over an Ethernet network having high power needs.

SUMMARY OF THE INVENTION

Accordingly, it is a principal object of the present invention to overcome the disadvantages of prior art in powering remote devices. This is provided in the present invention by an architecture enabling simultaneous power feeding from multiple sets of wire pairs, the power being combined by a power combiner.

In particular the invention provides for a local area network adapted to supply power to powered devices over a plurality of paths thus supplying high power, the local area network comprising: at least one powered device; a hub adapted for communicating data to and from the at least one powered device; communication cabling connecting the at least one powered device to the hub, the communication cabling comprising a first set of wire pairs utilized for communicating data between the at least one powered device and the hub and a second set of wire pairs; a first power output adapted to supply a first power over at least a portion of the first set of wire pairs; a second power output adapted to supply a second power over at least a portion of the second set of wire pairs; and a combiner operable to receive the first power over the at least a portion of the first set of wire pairs and to receive the second power over the at least a portion of the second set of wire pairs, the combiner being further operable to combine the received first power and the received second power to a combined high power output.

In one embodiment the combiner comprises a control circuit operable to sense the successful operation of the combiner, the control circuit supplying the combined high power output to the at least one powered device in response to the sensed successful operation of the combiner. In one further embodiment the control circuit is a controller. In another further embodiment the first power output and the second power output are associated with midspan power insertion equipment. In another further embodiment the first power output is isolated from the second power output. In yet another further embodiment the first power output is not isolated from the second power output.

In one embodiment the first power output and the second power output comprise outputs of a single power source. In another embodiment the first power output and the second power output comprise separate outputs derived from a single power source. In yet another embodiment the second set of wires are utilized for communicating data between the at least one powered device and the hub.

In one exemplary embodiment, at least one of the first power output and the second power output are associated with midspan power insertion equipment. In a further exemplary embodiment the midspan power insertion equipment conforms to the IEEE 802.3af standard. In another exemplary embodiment at least one of the first power output and the second power output are associated with the hub. In a further exemplary embodiment at least one of the first power output and the second power output associated with the hub conforms to the IEEE 802.3af standard.

In one embodiment the first power output is associated with the hub, and the second power output is associated with midspan power insertion equipment. In another embodiment the first power output and the second power output are associated with midspan power insertion equipment. In yet another embodiment the first power output and the second power output are associated with the hub. In another embodiment the hub adapted for communicating data to and from the at least one powered device operates according to at least one of 10 Base-T, 100 Base-T and 1000 Base-T.

In another embodiment the combiner is operable to signal at least one of the first power output and the second power output that that the combiner is operable to produce the high power output. In one further embodiment the signal comprises changing the class identification.

In an exemplary embodiment the combined high power output is supplied to a load. In one further exemplary embodiment the load is operable in accordance with the IEEE 802.3af standard. In another further exemplary embodiment the load comprises at least one of: a wireless access point; a laptop computer; a desk top computer; a security camera having at least one of pan, tilt and zoom functionality; and an entrance control device. In another further exemplary embodiment the combiner is located within the load. In yet another further exemplary embodiment the load is operable in a low power mode and a high power mode. In an even further exemplary embodiment the combiner is further operable to supply low power to the load for operation of the load in the low power mode in the absence of the combined high power. In an even further exemplary embodiment the combiner is further operable to signal the load of the low power supply operation.

The invention also provides for a combiner for use with a powered device having high power needs, the combiner comprising: a first power input adapted to receive a first power signal over a first set of wire pairs utilized to carry communication data; a second power input adapted to receive a second power signal over a second set of wire pairs, wherein the first power signal is combined with the second power signal to produce a combined high power signal; and a control circuit operable to sense the combined high power signal and to supply the combined high power signal to a powered device in response to the sensed combined high power signal.

In one embodiment the powered device is operable in accordance with the IEEE 802.3af standard. In another embodiment the powered device comprises at least one of: a wireless access point; a laptop computer; a desk top computer; a security camera having at least one of pan, tilt and zoom functionality; and an entrance control device. In yet another embodiment the combiner is located within the powered device. In yet another embodiment the combiner is located outside of the powered device.

In another exemplary embodiment the combiner is operable in a low power mode in the absence of the sensed combined high power signal. In yet another exemplary embodiment the control circuit is further operable to supply a low power signal to the load for operation in a low power mode in the absence of the combined high power signal. In a further exemplary embodiment the control circuit is further operable to signal the load of the low power mode.

In one embodiment the control circuit is a controller. In another embodiment the combiner further comprises at least one DC/DC converter. In yet another embodiment the combiner further comprises a first DC/DC converter associated with the first power input and a second DC/DC converter associated with the second power input. In one further embodiment the first DC/DC converter is connected in series with the second DC/DC converter. In another further embodiment the first DC/DC converter is connected in parallel with the second DC/DC converter. In a further embodiment the combiner further comprises a first PWM/resonance controller associated with the first DC/DC converter and a second PWM/resonance controller associated with the second DC/DC converter.

In another embodiment the combiner further comprises a transformer having a first primary associated with the first power input and a second primary associated with the second power input. In a further embodiment the transformer comprises a secondary associated with the combined high power.

The invention also provides for a method of supplying power to a powered device comprising the steps of: receiving a first power over a first set of wire pairs; receiving a second power over a second set of wire pairs; combining the first power and the second power; sensing the success of the combining of the first power and the second power; and enabling a combined high power output in response to the sensing.

In one embodiment the method further comprises the steps of: sensing an unsuccessful combining of the first power and the second power; comparing at least one of the first and the second received power to a reference; and supplying low power in response to the comparing. In a further embodiment the method further comprises the step of signaling the powered device of the supplied low power.

In another embodiment the method further comprises the step of: signaling at least one of at least one of the source of the received first power and the source of the received second power of the combining. In a further embodiment the step of signaling comprises changing the classification.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1a illustrates a high level block diagram of a first alternative network configuration for remote powering from an endpoint PSE known to the prior art;

FIG. 1c illustrates a high level block diagram of an alternative network configuration for remote powering from a midspan PSE known to the prior art;

FIG. 5a illustrates a high level flow chart of a preferred operation of a control circuit of FIG. 3a.

DETAILED DESCRIPTION OF THE PREFERRED EMBODIMENTS

Figure 1B:
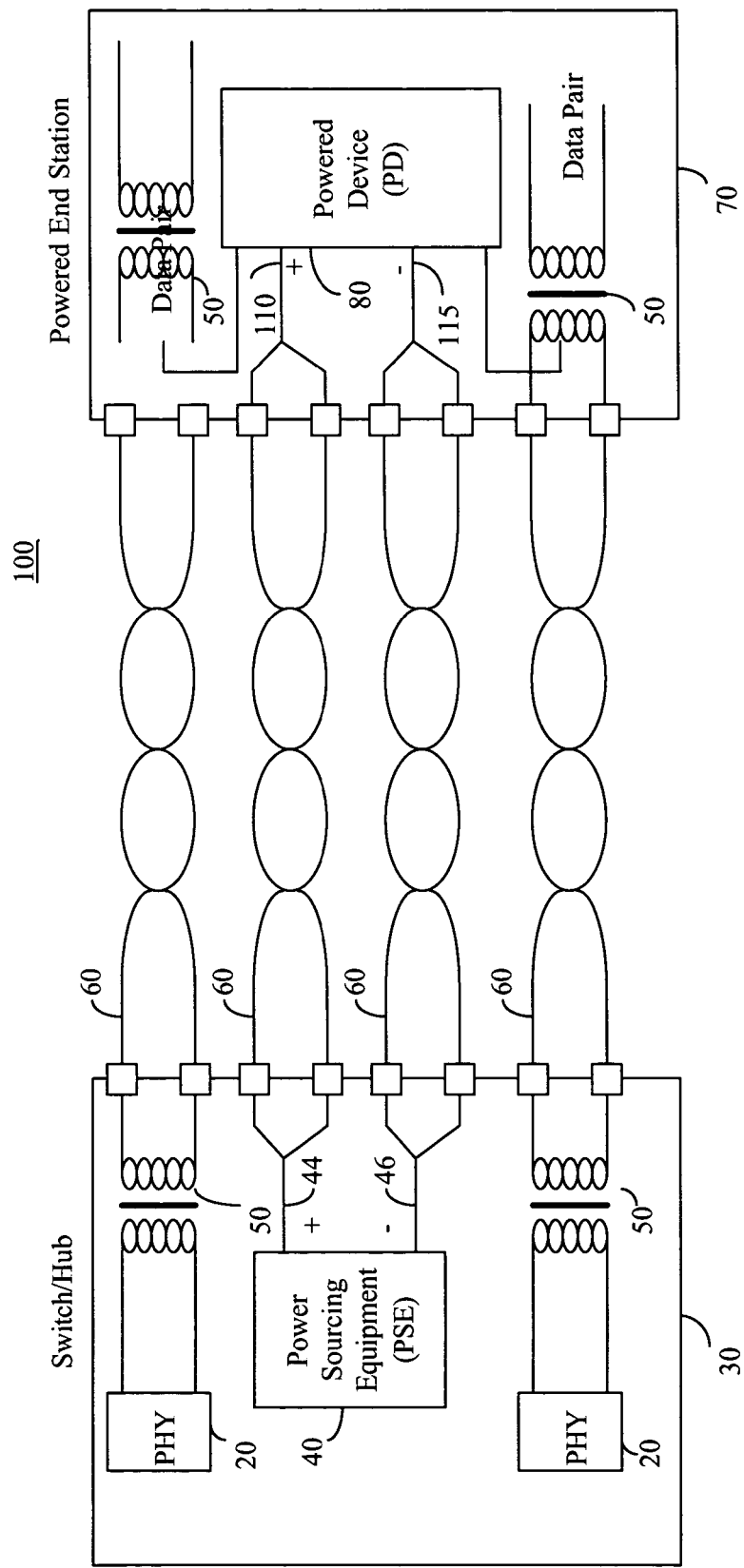
FIG. 1b illustrates a high level block diagram of a second alternative network configuration for remote powering from an endpoint PSE known to the prior art.

The present embodiments enable an architecture for power feeding over a first set of wire pairs utilized for communicating data to and from a powered device requiring high power and simultaneous power feeding over a second set of wire pairs. In one embodiment the second set of wire pairs are spare pairs not utilized for data communication. In another embodiment the second set of wire pairs are utilized for data communications, for example in the case of 1000Base-T or Gigabit Ethernet. For the purposes of this patent, high power needs are defined as power needs in excess of 12.95 watts at the PD end, the 12.95 watt power limit being defined by the IEEE802.3af-2003 standard. A combined high power output is hereinafter interchangeably called a high power signal. The term power is meant to include any combination of electrical voltage and current capable of supplying power to a PD, and is interchangeably used herein with the term power signal.

A high power PD may comprise: a wireless access point; laptop computer; desk top computer; security camera having pan, tilt zoom functionality; or an entrance control. The invention is operable by hub equipment operable according to any of 10 Base-T, 100 Base-T and 1000 Base-T.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The invention is being described as an Ethernet based network, with a powered device being connected thereto. It is to be understood that the powered device is preferably an IEEE 802.3 compliant device preferably employing a 10Base-T, 100Base-T or 1000Base-T connection.

FIG. 1a illustrates a high level block diagram of a first alternative network configuration 10 for remote powering from an endpoint PSE known to the prior art. Network configuration 10 comprises: switch/hub equipment 30 comprising first and second physical layer (PHY) controllers 20, endpoint power sourcing equipment (PSE) 40 having positive output lead 44 and negative power output lead 46, and first and second transformers 50; first, second, third and fourth twisted pair connections 60; and powered end station 70 comprising powered device (PD) 80 having positive and negative power input leads 90, 95 and third and fourth transformers 50. Positive output lead 44 and negative output lead of endpoint PSE 40 are connected, respectively, to the center tap of the secondary of first and second transformers 50. The primary of first and second transformers 50 are each connected to communication devices, typically through first and second PHY 20, respectively. The output leads of the secondary of first and second transformers 50 are each connected to a first end of first and second twisted pair connections 60, respectively. The second end of first and second twisted pair connections 60, are respectively connected to the primary of third and fourth transformers 50 located within powered end station 70. The center tap of the primary of third transformer 50 is connected to positive power input 90 of PD 80. The center tap of the primary of fourth transformer 50 is connected to negative power input 95 of PD 80. In a preferred embodiment, first and second transformers 50 are part of endpoint PSE 40, and third and fourth transformers 50 are part of PD 80.

In operation, endpoint PSE 40 supplies power over first and second twisted pair connection 60, thus supplying both power and data over first and second twisted pair connections 60 to PD 80. Third and fourth twisted pair connections 60 are not utilized, and are thus available as spare connections. Third and fourth twisted pair connections 60 are shown connected to PD 80 in order to allow operation alternatively in a manner that will be described further hereinto below in relation to FIG. 1b over unused third and fourth twisted pair connections 60. Positive power input lead 90 of PD 80 is operatively connected to positive power output lead 44 of endpoint PSE 40 through first twisted pair connection 60, center tapped primary of third transformer 50 and the center tapped primary of first transformer 50. Negative power input lead 95 of PD 80 is operatively connected to negative power output lead 46 of endpoint PSE 40 through second twisted pair connection 60, the center tapped primary of fourth transformer 50 and the center tapped primary of second transformer 50.

FIG. 1b illustrates a high level block diagram of a second alternative network configuration 100 for remote powering from an endpoint PSE known to the prior art. Network configuration 100 comprises: switch/hub equipment 30 comprising first and second PHY 20, endpoint PSE 40 having positive power output lead 44 and negative power output lead 46, and first and second transformers 50; first, second, third and fourth twisted pair connections 60; and powered end station 70 comprising PD 80 having positive power input lead 110 and negative power input lead 115, and third and fourth transformers 50. The primary of first and second transformers 50 are connected to communication devices, typically through first and second PHY 20, respectively. The output leads of first and second transformers 50 are each connected to a first end of first and second twisted pair connections 60, respectively. Positive power output lead 44 of endpoint PSE 40 is connected to both leads of third twisted pair connection 60 and negative power output lead 46 of PSE 40 is connected to both leads of fourth twisted pair connection 60. The second end of first and second twisted pair connection 60 is connected to the primary of third and fourth transformer 50, respectively, located within powered end station 70. The center tap of the primary of third and fourth transformer 50 is connected to PD 80. The second end of third and fourth twisted pair connections 60 are respectively connected to positive and negative power inputs 110 and 115 of PD 80. In a preferred embodiment, first and second transformers 50 are part of endpoint PSE 40, and third and fourth transformers 50 are part of PD 80.

In operation endpoint PSE 60 supplies power to PD 80 over third and fourth twisted pair connection 60, with data being supplied over first and second twisted pair connection 60. Power and data are thus supplied over separate connections, and are not supplied over a single twisted pair connection. The center tap connection of third and fourth transformer 50 is not utilized, but is shown connected in order to allow operation alternatively as described above in relation to FIG. 1a. The configurations of FIG. 1a and FIG. 1b thus allow for powering of PD 80 by endpoint PSE 40 either over the set of twisted pair connections 60 utilized for data communications, or over the set of twisted pair connections 60 not utilized for data communications.

FIG. 1c illustrates a high level block diagram of an alternative network configuration 150 for remote powering from a midspan PSE known to the prior art. Network configuration 150 comprises: switch/hub equipment 35 comprising first and second PHY 20 and first and second transformers 50; first through eighth twisted pair connections 60; powered end station 70 comprising PD 80 having positive power input lead 110 and negative power input lead 115, and third and fourth transformers 50; and midspan power insertion equipment 160 comprising midspan PSE 40 having positive power output lead 44 and negative power output lead 46. The primary of first and second transformers 50 are connected, respectively, to communication devices typically through first and second PHY 20. The output leads of the secondary of first and second transformers 50 are connected, respectively, to a first end of first and second twisted pair connections 60. The second end of first and second twisted pair connections 60 are connected as a straight through connection through midspan power insertion equipment 160 to a first end of fifth and sixth twisted pair connections 60, respectively. A second end of fifth and sixth twisted pair connections 60 are connected to the primary of third and fourth transformer 50, respectively, located within powered end station 70. Third and fourth twisted pair connections 60 are shown connected between switch/hub 30 and midspan power insertion equipment 160, however no internal connection to either third of fourth twisted pair connection is made.

Positive power output lead 44 of midspan PSE 40 is connected to both leads of one end of seventh twisted pair connection 60 and negative power output lead 46 of midspan PSE 40 is connected to both leads of one end of eighth twisted pair connection 60. The second end of both leads of both seventh and eighth twisted pair connections 60 respectively, are connected to positive and negative power inputs 110, 115 of PD 80. In a preferred embodiment, third and fourth transformers 50 are part of PD 80. The center tap of the primary of third and fourth transformer 50, located within powered end station 70, is connected to PD 80.

In operation midspan PSE 40 of midspan power insertion equipment 160 supplies power to PD 80 over seventh and eighth twisted pair connections 60, with data being supplied from switch/hub equipment 35 over first and second twisted pair connections 60 through midspan power insertion equipment 160 to fifth and sixth twisted pair connections 60. Power and data are thus supplied over separate connections, and are not supplied over a single twisted pair connection. The center tap connection of third and fourth transformer 50 is not utilized, but is shown connected in order to allow operation alternatively as described above in relation to FIG. 1a.

Figure 2A:
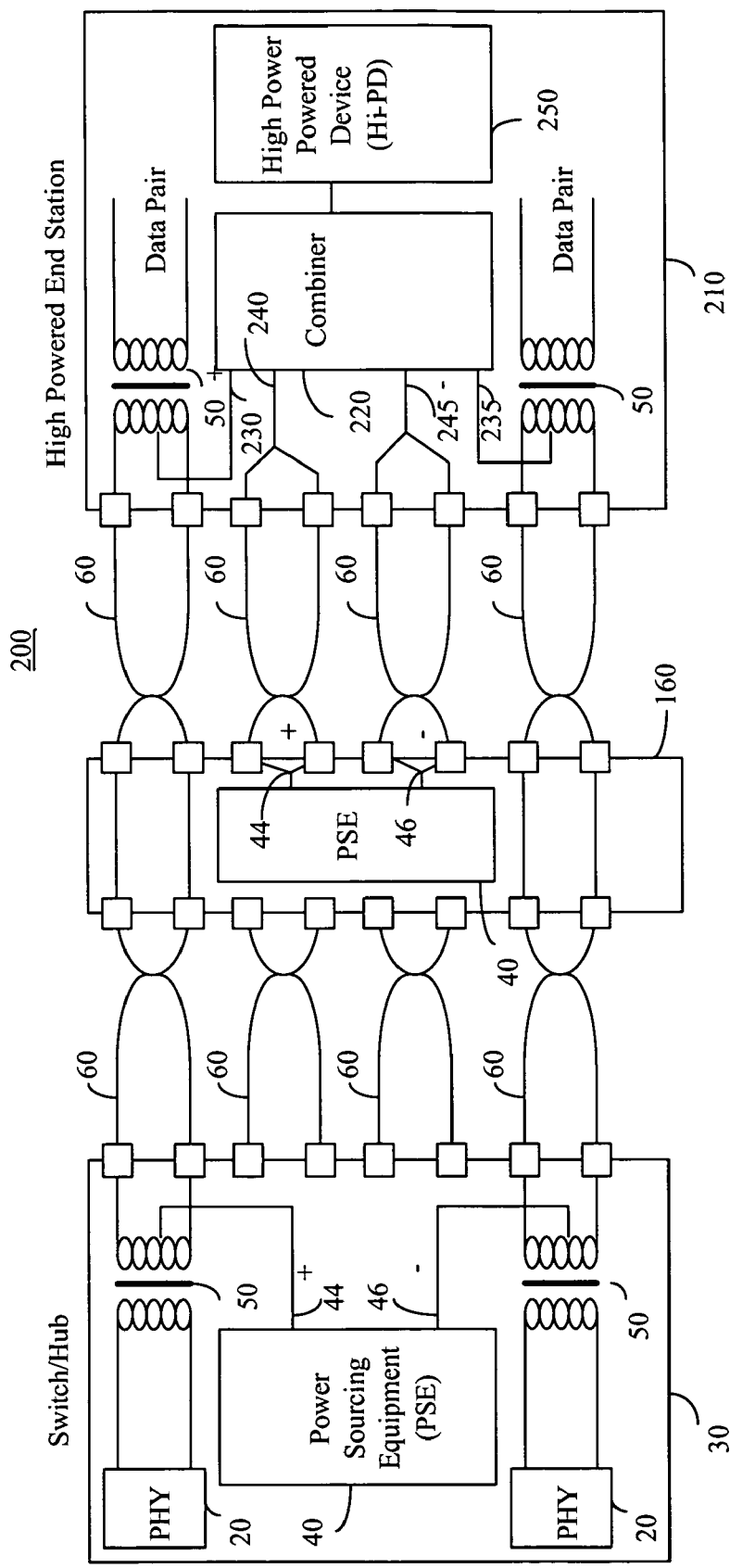
FIG. 2a illustrates a high level block diagram a first embodiment of multiple path power feeding according to the principle of the invention.

FIG. 2a illustrates a high level block diagram of a first embodiment of a multiple path power feeding network configuration, herein designated network configuration 200, according to the principle of the invention. Network configuration 200 comprises: switch/hub equipment 30 comprising first and second PHY 20, first and second transformers 50 and endpoint PSE 40 having positive power output lead 44 and negative power output lead 46; first through eighth twisted pair connections 60; midspan power insertion equipment 160 comprising midspan PSE 40 having positive output lead 44 and negative power output lead 46; and high powered end station 210 comprising third and fourth transformers 50, power combiner 220 having first positive power input 230, first negative power input 235, second positive power input 240 and second negative power input 245 and high powered PD (Hi-PD) 250.

The primary of first and second transformers 50 are respectively connected to communication devices typically through first and second PHY 20. The output leads of the secondary of first and second transformers 50 are each connected to a first end of first and second twisted pair connections 60, respectively. The center taps of the secondary of first and second transformers 50 are connected, respectively, to positive and negative power output leads 44, 46 of endpoint PSE 40. The second end of first and second twisted pair connections 60 are connected as a pass-through connection through midspan power insertion equipment 160 to a first end of fifth and sixth twisted pair connections 60, respectively. A second end of fifth and sixth twisted pair connections 60 are connected to the primary of third and fourth transformer 50, respectively, located within powered end station 210. Third and fourth twisted pair connections 60 are shown connected between switch/hub 30 and midspan power insertion equipment 160, however no internal connection to either end of third or fourth twisted pair connection 60 is made.

The center tap of the primary of third transformer 50 is connected to positive power input 230 of power combiner 220, and the center tap of the primary of fourth transformer 50 is connected to negative power input 235 of power combiner 220. Positive power output lead 44 of midspan PSE 40 is connected to both leads of a first end of seventh twisted pair connection 60 and negative power output lead 46 of midspan PSE 40 is connected to both leads of a first end of eighth twisted pair connection 60. The second end of both leads of seventh twisted pair connection 60 are connected to positive power input 240 of power combiner 220, and second end of both leads of eight twisted pair connection 60 are connected to negative power input 245 of power combiner 220. The output of power combiner 220 is connected to Hi-PD 250. In an exemplary embodiment power combiner 220 is co-housed with Hi-PD 250.

It is to be understood that twisted pair connections are not restricted to continuous wire pairs. Patch cords, patch panels and other connections may be utilized in place of, or in combination with, direct connections without exceeding the scope of the invention.

In operation endpoint PSE 40 supplies power to power combiner 220 over the serial combination of first and fifth twisted pair connections 60 and the serial combination of second and sixth twisted pair connections 60. The serial combination of first and fifth twisted pair connections 60 and the serial combination of second and sixth twisted pair connections 60 are simultaneously utilized to carry data. Midspan PSE 40 supplies power to power combiner 220 over seventh and eighth twisted pair connections 60, thus supplying a second power path over pairs not being utilized to carry data.

Power combiner 220 functions to combine the power supplied by endpoint PSE 40 and midspan PSE 40 to a combined power output, and optionally to convert the voltages of endpoint PSE 40 and midspan PSE 40 to an appropriate voltage or voltages for supply to Hi-PD 250. Power combiner 220 further functions to enable each of endpoint PSE 40 and midspan PSE 40 to detect, and optionally to classify, high powered end station 210 as a powered device. Preferably this detection and optional classification is accomplished in accordance with the applicable IEEE 802.3af standard. Power combiner 220 further functions to combine the power supplied by first and second PSE 40 so as to supply a single high power source to Hi-PD 250.

Figure 2B:
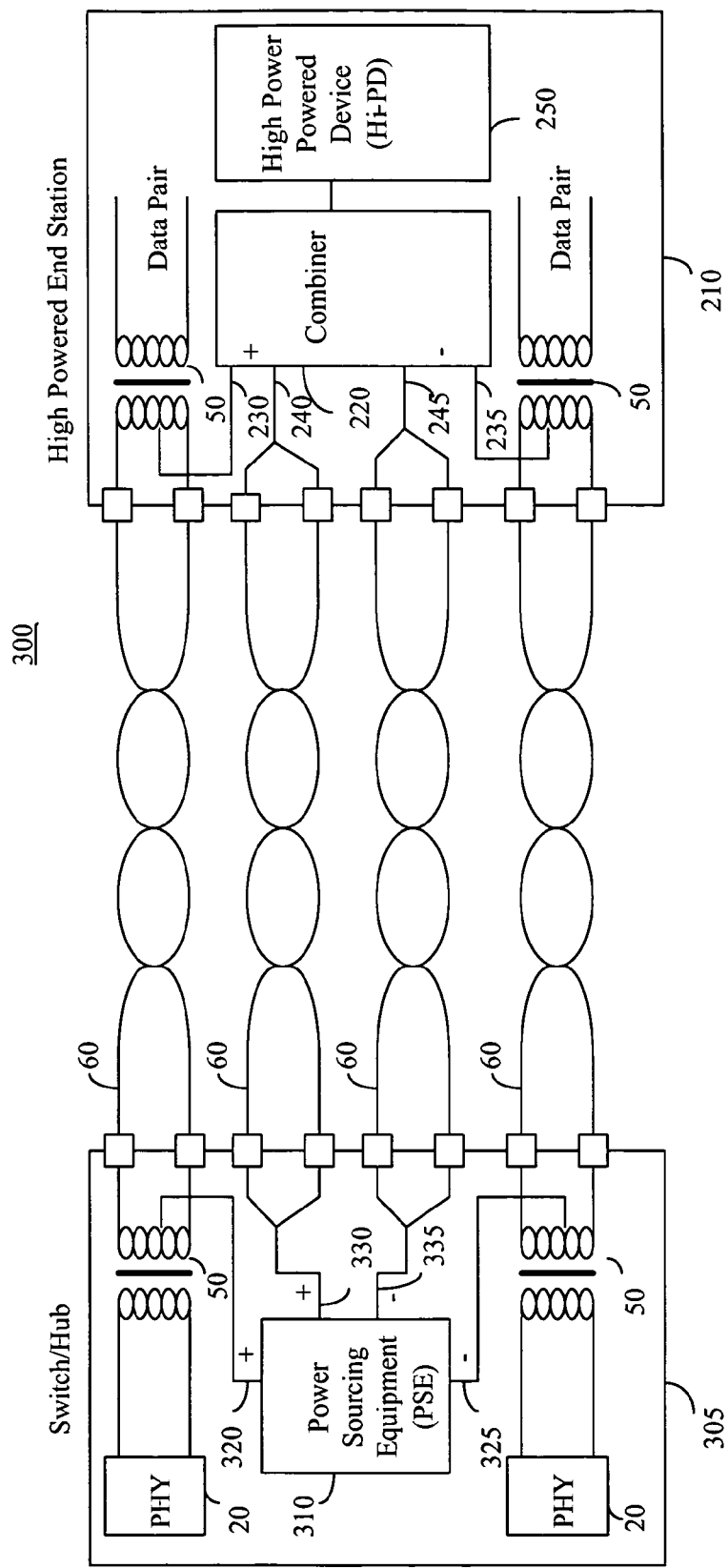
FIG. 2b illustrates a high level block diagram of a second embodiment of multiple path power feeding according to the principle of the invention.

FIG. 2b illustrates a high level block diagram of a second embodiment of a multiple path power feeding network configuration, herein designated network configuration 300, according to the principle of the invention. Network configuration 300 comprises: high power switch/hub equipment 305 comprising first and second PHY 20, first and second transformers 50 and endpoint PSE 310 having a first power output comprising first positive power output lead 320 and first negative power output lead 325, a second power output comprising second positive power output lead 330 and second negative power output lead 335; first through fourth twisted pair connections 60; and high powered end station 210 comprising third and fourth transformers 50, power combiner 220 having first positive power input 230, first negative power input 235, second positive power input 240 and second negative power input 245 and high powered PD (Hi-PD) 250.

The primary of first and second transformers 50 are each connected to communication devices typically through first and second PHY 20, respectively. The output leads of the secondary of first and second transformers 50 are respectively connected to a first end of first and second twisted pair connections 60. The center tap of the secondary of first and second transformers 50 are respectively connected to first positive output 320 and first negative output 325 of endpoint PSE 310. The second end of first and second twisted pair connections 60 are respectively connected to the primary of third and fourth transformer 50 located within high powered end station 210. A first end of both leads of each of third and fourth twisted pair connections 60, respectively, are connected to second positive output 330 and second negative output 335 of endpoint PSE 310.

The center tap of the primary of third and fourth transformers 50 are respectively connected to first positive power input 230 and first negative power input 235 of power combiner 220. A second end of both leads of third and fourth twisted pair connections 60 are respectively connected to second positive power input 240 and second negative power input 245 of power combiner 220. The output of power combiner 220 is connected to Hi-PD 250. In an exemplary embodiment power combiner 220 is co-housed with Hi-PD 250.

In operation, the first output of PSE 310 located in high power switch/hub 305, constituted of first positive output 320 and first negative output 325, supplies power to power combiner 220 over first and second twisted pair connections 60, simultaneously with data being transmitted over first and second twisted pair connection 60. The second output of PSE 310 located in switch/hub 305, constituted of second positive output 330 and second negative output 335, supplies power to power combiner 220 over third and fourth twisted pair connections 60. In a first embodiment first and second endpoint PSE 310 power outputs are isolated from each other. In a second embodiment first and second endpoint PSE 310 power outputs are non-isolated from each other. In one exemplary embodiment, first and second endpoint PSE 310 power outputs are separate outputs of a single power source. In another exemplary embodiment, first and second endpoint PSE 310 power outputs are derived from a single output of a single power source.

Power combiner 220 functions to combine the power supplied by first and second outputs of PSE 310 to a combined power output, and optionally to convert the voltages of first and second outputs of PSE 310 to an appropriate voltage or voltages for supply to Hi-PD 250. Power combiner 220 further functions to enable each of first and second power outputs of endpoint PSE 310 to detect, and optionally to classify, high powered end station 210 as a powered device. Preferably this detection and optional classification is accomplished in accordance with the applicable IEEE 802.3af standard. It is to be noted that endpoint PSE 310, upon detection and classification on both first and second outputs, is thus notified that high powered end station 210 is operable to draw power from both ports. Power combiner 220 further functions to combine the power supplied by first and second power outputs of endpoint PSE 310 so as to supply a single high power source to Hi-PD 250.

Figure 2C:
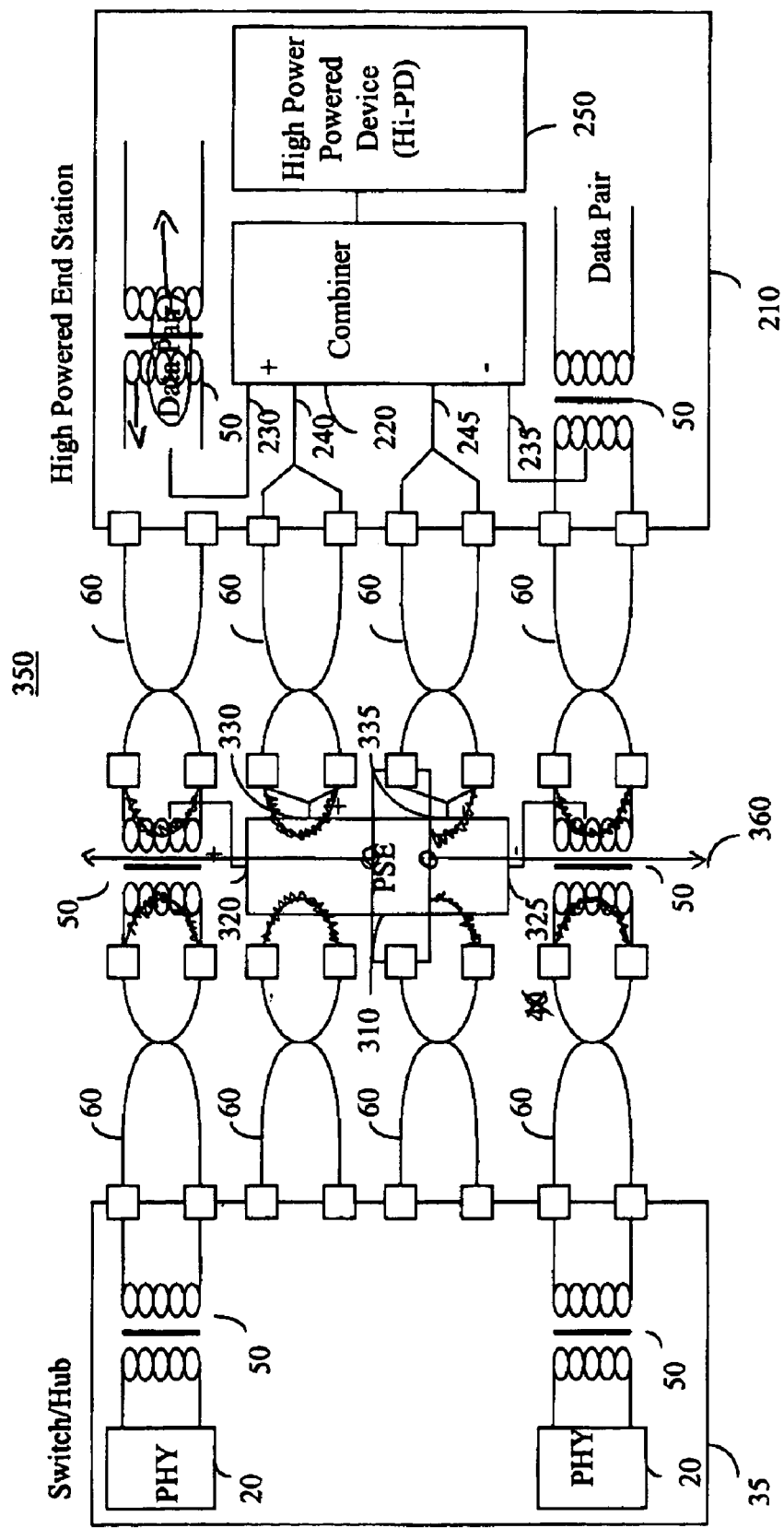
FIG. 2c illustrates a high level block diagram of a third embodiment of multiple path power feeding according to the principle of the invention.

FIG. 2c illustrates a high level block diagram of a third embodiment of a multiple path power feeding network configuration, herein designated network configuration 350, according to the principle of the invention. Network configuration 350 comprises: switch/hub equipment 35 comprising first and second PHY 20 and first and second transformers 50; first through eighth twisted pair connections 60; high power midspan power insertion equipment 360 comprising third and fourth transformers 50 and midspan PSE 310 having a first power output comprising first positive power output lead 320 and first negative power output lead 325, and further having a second power output comprising second positive power output lead 330 and second negative power output lead 335; and high powered end station 210 comprising fifth and sixth transformers 50, power combiner 220 having first positive power input 230, first negative power input 235, second positive power input 240 and second negative power input 245 and high powered PD (Hi-PD) 250.

The primary of first and second transformers 50 are each connected to communication devices typically through first and second PHY 20, respectively. The output leads of the secondary of first and second transformers 50 are respectively connected to a first end of first and second twisted pair connections 60. The second end of each of first and second twisted pair connections 60 are connected to the primary of third and fourth transformer 50, respectively, located within high power midspan power insertion equipment 360. Third and fourth twisted pair connections 60 are connected between switch/hub 30 and high power midspan power insertion equipment 360, however no internal connection is made to either third or fourth twisted pair connection 60.

The center taps of the secondary of third and fourth transformers 50 are connected, respectively, to first positive output 320 and first negative output 325 of midspan PSE 310. A first end of each of fifth and sixth twisted pair connections 60, respectively, is connected to the secondary of third and fourth transformers 50. A second end of each of fifth and sixth twisted pair connections, respectively, is connected to the primary of fifth and sixth transformers 50, located in high powered end station 210. Both leads of a first end of each of seventh and eighth twisted pair connections 60, respectively, are connected to second positive output 330 and second negative output 335 of midspan PSE 310.

The center tap of the primary of fifth and sixth transformers 50, respectively, is connected to first positive power input 230 and first negative power input 235 of power combiner 220. Both leads of a second end of seventh and eighth twisted pair connections 60, respectively, are connected to second positive power input 240 and second negative power input 245, respectively, of power combiner 220. The output of power combiner 220 is connected to Hi-PD 250. In an exemplary embodiment power combiner 220 is co-housed with Hi-PD 250.

In operation, the first output of midspan PSE 310, constituted of first positive output 320 and first negative output 325, supplies power to power combiner 220 over fifth and sixth twisted pair connections 60, simultaneously with data being transmitted over fifth and sixth twisted pair connection 60 supplied from or to switch/hub 30. The second power output of midspan PSE 310 located in midspan insertion equipment 360, constituted of second positive output 330 and second negative output 335, supplies power to power combiner 220 over seventh and eighth twisted pair connections 60. In a first embodiment first and second midspan PSE 310 power outputs are isolated from each other. In a second embodiment first and second midspan PSE 310 power outputs are non-isolated from each other. In one exemplary embodiment, first and second midspan PSE 310 power outputs are separate outputs of a single power source. In another exemplary embodiment, first and second midspan PSE 310 power outputs are derived from a single output of a single power source.

Power combiner 220 functions to combine the power supplied by first and second outputs of PSE 310 to a combined power output, and optionally to convert the voltages of first and second outputs of PSE 310 to an appropriate voltage or voltages for supply to Hi-PD 250. Power combiner 220 further functions to enable each of first and second power outputs of midspan PSE 310 to detect, and optionally to classify, high powered end station 210 as a powered device. Preferably this detection and optional classification is accomplished in accordance with the applicable IEEE 802.3af standard. It is to be noted that midspan PSE 310, upon detection and classification on both first and second outputs, is thus aware that high powered end station 210 is operable to draw power from both ports. Power combiner 220 further functions to combine the power supplied by first and second power outputs of midspan PSE 310 so as to supply a single high power source to Hi-PD 250. It is to be understood by those skilled in the art that any power inserted by switch/hub 35 in a configuration similar to that shown in FIG. 1a, will be blocked at the primary of third and fourth transformers 50. Furthermore, switch/hub 35 will not identify a valid powered device, and thus power will not be supplied over data pairs 60.

Figure 2D:
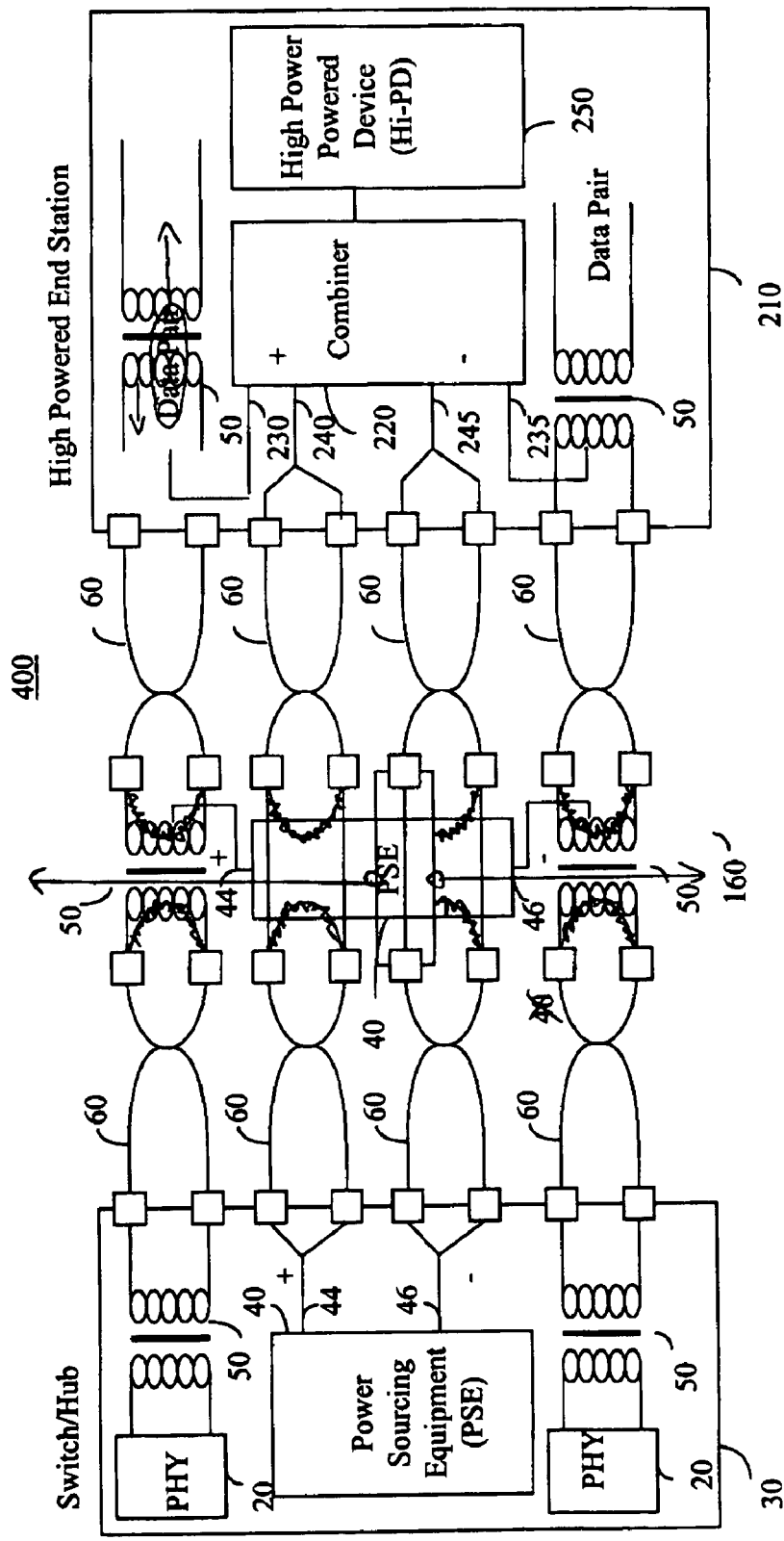
FIG. 2d illustrates a high level block diagram of a fourth embodiment of multiple path power feeding according to the principle of the invention.

FIG. 2d illustrates a high level block diagram of a fourth embodiment of a multiple path power feeding network configuration, herein designated network configuration 400, according to the principle of the invention. Network configuration 400 comprises: switch/hub equipment 30 comprising first and second PHY 20, first and second transformers 50 and endpoint PSE 40 having positive power output lead 44 and negative power output leads 46; first trough eighth twisted pair connections 60; midspan power insertion equipment 160 comprising third and fourth transformers 50 and midspan PSE 40 having positive power output lead 44 and negative power output lead 46; and high powered end station 210 comprising fifth and sixth transformers 50, power combiner 220 having first positive power input 230, first negative power input 235, second positive power input 240 and second negative power input 245 and high powered PD (Hi-PD) 250.

The primary of first and second transformers 50 are respectively connected to communication devices typically through first and second PHY 20. The output leads of the secondary of first and second transformers 50 are each connected to a first end of first and second twisted pair connections 60, respectively. The second end of first and second twisted pair connections 60 is connected, respectively, to the primary of third and fourth transformers 50 location in midspan power insertion equipment 160. Both leads of a first end of third and fourth twisted pair connections 60, respectively, are connected to positive power output lead 44 and negative power output lead 46 of endpoint PSE 40. The center tap of the secondary of third and fourth transformers 50, respectively, is connected to positive power output lead 44 and negative power output lead 46 of midspan PSE 40. A first end of fifth and sixth twisted pair connections 60 respectively, are connected to the secondary of third and fourth transformers 50. A second end of fifth and sixth twisted pair connections 60 are connected to the primary of fifth and sixth transformer 50, respectively, located within high powered end station 210. The second end of third and fourth twisted pair connections 60, respectively, are connected as a pass-through connection of midspan power insertion equipment 160 to one end of seventh and eighth twisted pair connections 60. The second end of both leads of seventh and eight twisted pair connections 60 are respectively connected to second positive power inputs 240 and second negative power input 245 of power combiner 220.

The center tap of the primary of third transformer 50 is connected to first positive power input 230 of power combiner 220, and the center tap of the primary of fourth transformer 50 is connected to first negative power input 235 of power combiner 220. The output of power combiner 220 is connected to Hi-PD 250. In an exemplary embodiment power combiner 220 is co-housed with Hi-PD 250.

In operation, endpoint PSE 40 located in switch/hub 30 supplies power to power combiner 220 over the serial combination of third and seventh twisted pair connections 60 and the serial combination of fourth and eighth twisted pair connections 60. The serial combination of first and fifth twisted pair connections 60 and the serial combination of second and sixth twisted pair connections 60 are utilized to carry data. Midspan PSE 40 supplies power to power combiner 220 over fifth and sixth twisted pair connections 60, thus supplying a second power path over pairs being utilized to carry data.

Power combiner 220 functions to combine the power supplied by endpoint PSE 40 and midspan PSE 40 to a combined power output, and optionally to convert the voltages of endpoint PSE 40 and midspan PSE 40 to an appropriate voltage or voltages for supply to Hi-PD 250. Power combiner 220 further functions to enable each of endpoint PSE 40 and midspan PSE 40 to detect, and optionally to classify, high powered end station 210 as a powered device. Preferably this detection and optional classification is accomplished in accordance with the applicable IEEE 802.3af standard. Power combiner 220 further functions to combine the power supplied by first and second PSE 40 so as to supply a single high power source to Hi-PD 250.

While the above has been described utilizing a two pairs two carry data, and two spare pairs of wires, this is not meant to be limiting in any way. It is meant to include, without limitation, 1000Base-T or gigabit Ethernet for which 4 pairs of wire carry data. In such an implementation, all four pairs of wires preferably carry both power and data. In an exemplary embodiment, power is added to all data carrying pairs by high powered midspan insertion equipment in accordance with the principle of the current invention.

Figure 3A:
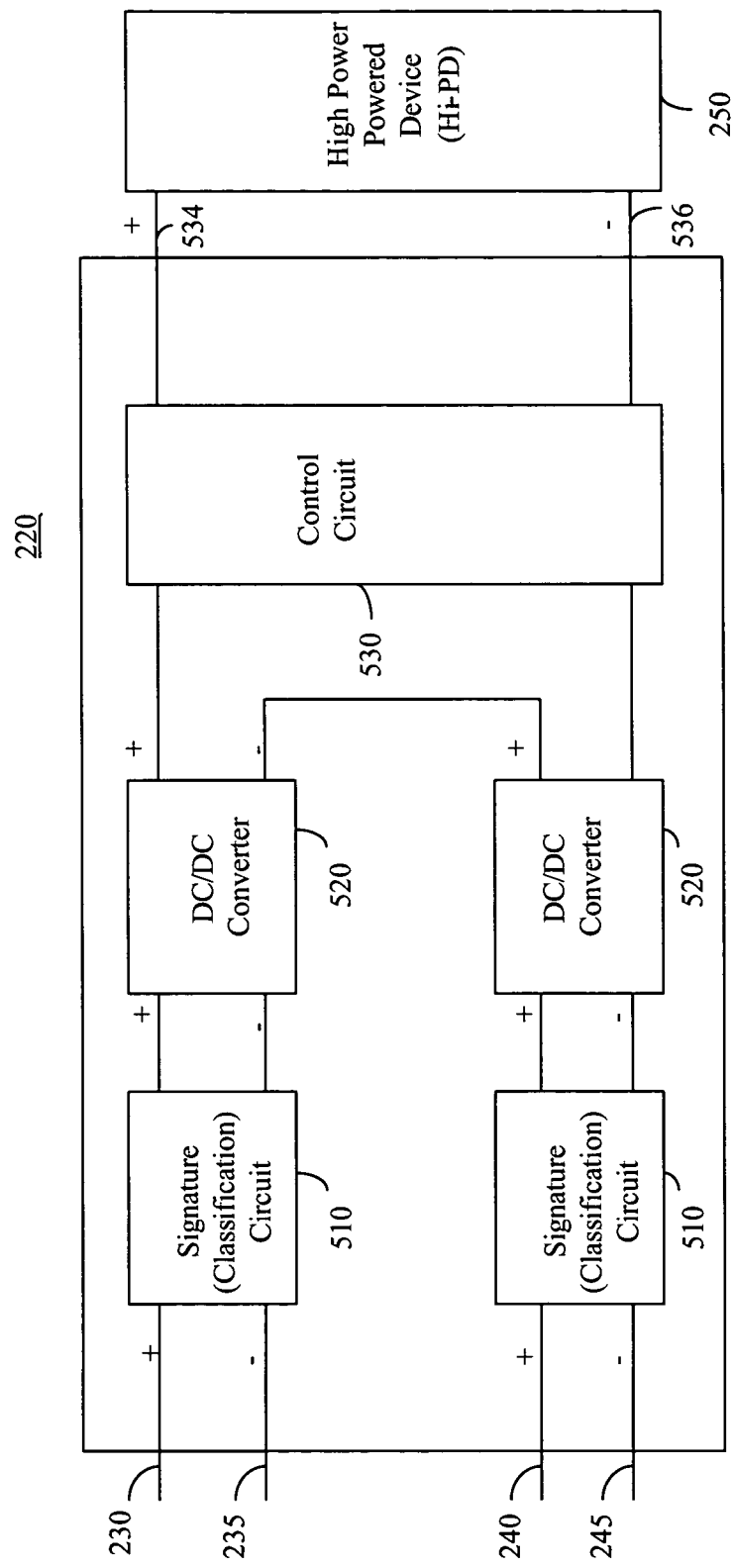
FIG. 3a illustrates a high level block diagram of a first embodiment of a power combiner according to the principle of the current invention.

FIG. 3a illustrates a high level block diagram of a first embodiment of a power combiner 220 according to the principle of the current invention comprising first power input having positive lead 230 and negative lead 235, second power input having positive lead 240 and negative lead 245, first and second signature circuits 510, first and second DC/DC converters 520 and control circuit 530 having positive output 534 and negative output 536. First positive and negative power input leads 230, 235 respectively, are connected to the input of first signature circuit 510. Second positive and negative power input leads 240, 245 respectively, are connected to the input of second signature circuit 510. The positive and negative outputs of first signature circuit 510 are connected to the input of first DC/DC converter 520 and the positive and negative outputs of second signature circuit 510 are connected to the input of second DC/DC converter 520. First and second DC/DC converters 520 are connected in series, with the negative output of first DC/DC converter 520 connected to the positive output of second DC/DC converter 520. The positive output of first DC/DC converter 520 is connected to the positive input of control circuit 530, and the negative output of second DC/DC converter 520 is connected to the negative input of control circuit 530. Positive output 534 and negative output 536 represent the output of power combiner 220 that is fed to Hi-PD 250 as shown in FIGS. 2a-2d.

In operation first and second signature circuit 510 function to enable first and second PSE 40 of FIGS. 2a and 2d, or each of first and second power outputs of PSE 310 of FIGS. 2b and 2c to detect, and optionally to classify, high powered end station 210 as a powered device. In an exemplary embodiment, first and second signature circuit 510 function in accordance with the requirements of the IEEE 802.3af standard. In another embodiment, first and second signature circuits 510 do not present a valid classification. In another embodiment a unique class is presented for high power devices. In an alternative embodiment, one or both of first and second signature circuit 510 additionally function to signal at least one of first and second PSE 40 of FIGS. 2a and 2d, or PSE 310 of FIGS. 2b and 2c that high powered end station 210 is a high power device. In a preferred embodiment the signaling is accomplished by switching the classification presented by signature circuit 510 at the end of the classification time period in a manner that will be described further hereinto below in relation to FIG. 4.

Figure 4:
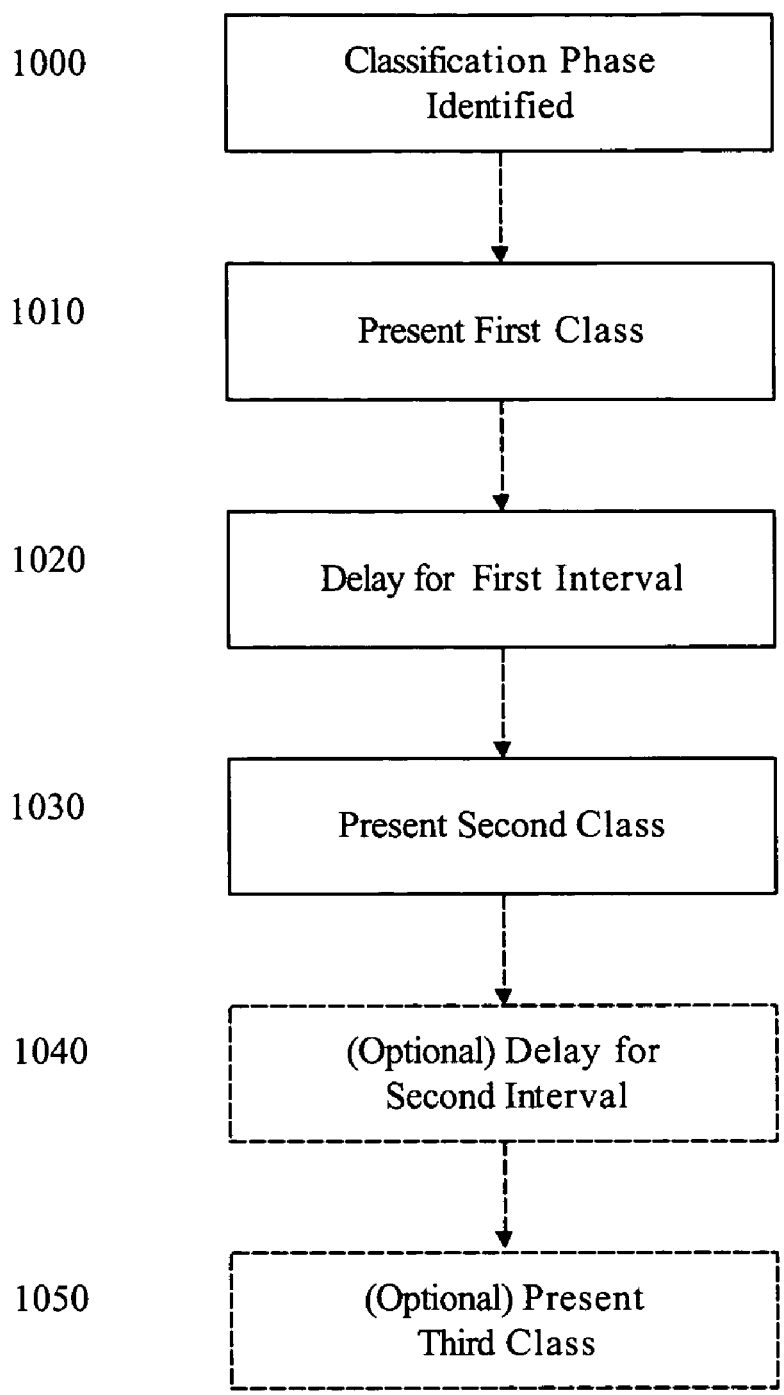
FIG. 4 illustrates a high level flow chart of a preferred operation of a signature circuit of FIG. 3a-FIG. 3d.

FIG. 4 illustrates a high level flow chart of the operation of one or both of first and second signature circuit 510 to signal at least one of first and second PSE 40 of FIGS. 2a and 2d, or PSE 310 of FIGS. 2b and 2c that high powered end station 210 is a high power device in accordance with the principle of the invention. In step 1000, signature circuit 510 identifies the classification phase. Preferably, a specified voltage across the input leads identifies the classification phase. In step 1010, a first class is presented. Preferably, a first class is presented by current flow within a specified range.

In step 1020, a first interval is delayed. Preferably, the first interval is equivalent to length of the classification phase as defined in the IEEE802.3af standard. In step 1030, a second class is presented, the second class being different from the first class.

In optional step 1040, a second interval is delayed. Preferably, the second interval is the same as the first interval. In optional step 1050, a third class is presented, the third class being different from the second class. In a preferred embodiment, the third class is also different from the first class.

In the embodiment of FIGS. 2b and 2c, PSE 310 is thus notified of the existence of Hi-PD 250. In one embodiment, PSE 310 relaxes the overload restriction in accordance with a preferred operation of Hi-PD 250. In another embodiment PSE 310 further monitors first and second power outputs (320, 325 and 330, 335) to ensure a balanced load. In the event of an imbalance, optionally PSE 310 shuts down power on both first and second power outputs (330, 335 and 340, 345). In another embodiment, PSE 310 utilizes the notification for fault prediction or maintenance.

In the embodiment of FIGS. 2a and 2d, at least one of first and second PSE 40 is thus notified of the existence of Hi-PD 250, and optionally is operable to relax the overload restriction in accordance with a preferred operation of Hi-PD 250. Preferably, the signaled PSE 40 communicates over existing data paths (not shown) with the non-signaled PSE 40 and notifies it of the joint load, and furthermore that the joint load is Hi-PD 250. Optionally, the non-signaled PSE 40 relaxes the overload restriction in accordance with a preferred operation of Hi-PD 250 in response to the received communication from the signaled PSE 40.

Referring back to FIG. 3a, first and second DC/DC converters 520 function to convert the DC power delivered from first and second PSE 40 of FIGS. 2a, 2d or first and second output of PSE 310 of FIGS. 2b, 2c to the required operating voltage of Hi-PD 250. In a non-limiting exemplary embodiment, approximately 48 Volts appear between positive input 230 and negative input 235, approximately 48 Volts appear between positive input 240 and negative input 245 and Hi-PD 250 is preferably powered by 12V DC. Thus, in the exemplary embodiment, first and second DC/DC converters 520 are each 48V to 6V DC converters known to those skilled in the art. First and second DC/DC converters 520 are preferably of the isolated type, such as a flyback converters, in order to meet isolation needs between the inputs 230, 235 and 240, 245 respectively, and outputs 534, 536 of power combiner 220. Furthermore, isolated DC/DC converters 520 are advantageous when utilized in network configuration 200 of FIG. 2a and network configuration 400 of FIG. 2d wherein power is supplied by both endpoint PSE 40 and midspan PSE 40. Non-isolated topologies, such as a buck DC/DC converter, are advantageously simpler and thus lower in cost, and are preferably utilized when isolation is not required.

Control circuit 530 functions to ensure that Hi-PD 250 does not receive power from first and second DC/DC converters 520 until both DC/DC converters 520 have stabilized at their normal operating voltage. A further preferred function of control circuit 530 is to provide hot start current limiting, thus preventing an overload of either of first and second DC/DC converters 520 during the initial inrush current of HI-PD 250. A further preferred function of control circuit 530 is to remove power from Hi-PD 250 in the event of a shut down of one of first and second DC/DC converters 520. It is to be understood that shut down of a DC/DC converter 520 may occur due to a failure of DC/DC converter 520, or due to a disconnect of power to the DC/DC converter 520 by PSE 40 of FIGS. 2a, 2d or PSE 310 of FIGS. 2b, 2c. A further preferred function of control circuit 530 is to protect power combiner 220 in the event of a short circuit condition across the output leads of power combiner 220. Preferably, in the event of an overcurrent condition, control circuit 530 disconnects the combined output of first and second DC/DC converters 520 for a pre-determined period of time. Optionally, in a manner that will be explained further below, after expiration of the pre-determined period of time, power is reconnected for a short trial period to test if the short circuit still exists. In another embodiment (not shown) control circuit 530 upon sensing an overcurrent condition shuts down the operation of first and second DC/DC converters 520.

In one preferred embodiment, control circuit 530 further functions during an overload caused by Hi-PD 250, to turn off power to Hi-PD 250. In a first exemplary embodiment this function is a result of the action of at least one PSE 40 of FIGS. 2a, 2d or at least one output of PSE 310 of FIGS. 2b, 2c, the overload condition having been passed through control circuit 530 to first and second DC/DC converters 520 and further to PSE 40 of FIGS. 2a, 2d or PSE 310 of FIGS. 2b, 2c. In a second exemplary embodiment this function is operative due to the voltage drop at the output of the combination of first and second DC/DC converters 520, the voltage drop being sensed by control circuit 530 thus initiating a shutdown due to an under voltage condition.

In one preferred embodiment, control circuit 530 further comprises hysteresis to allow for inrush current to Hi-PD 250 without triggering an overload condition. In another preferred embodiment, Hi-PD 250 has low power functionality and full power functionality. In this embodiment, control circuit 530 signals Hi-PD 250 to be at low power mode, and control circuit 530 supplies power when only one of first and second DC/DC converters 520 is operating. It is to be understood that in this embodiment, Hi-PD 250 will receive low power and low voltage, which will typically only suffice for critical functionality.

Figure 3B:
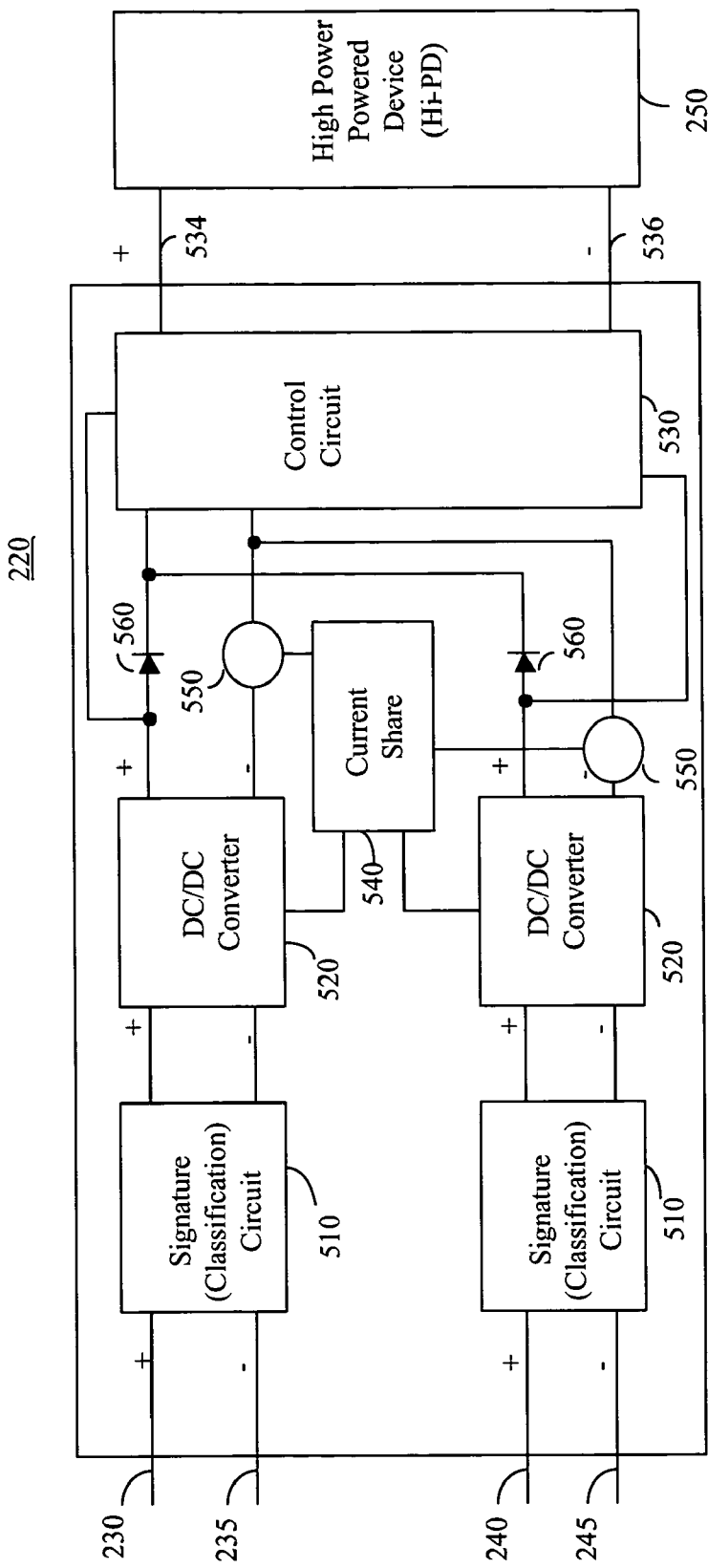
FIG. 3b illustrates a high level block diagram of a second embodiment of a power combiner according to the principle of the current invention.

FIG. 3b illustrates a high level block diagram of a second embodiment of a power combiner 220 according to the principle of the current invention comprising first power input having positive lead 230 and negative lead 235, second power input having positive lead 240 and negative lead 245, first and second signature circuits 510, first and second DC/DC converters 520, current share circuit 540, first and second current sensors 550, first and second diodes 560 and control circuit 530 having positive output 534 and negative output 536. First positive and negative power input leads 230, 235 respectively, are connected to the input of first signature circuit 510. Second positive and negative power input leads 240,245 respectively, are connected to the input of second signature circuit 510. The positive and negative outputs of first signature circuit 510 are connected to the input of first DC/DC converter 520 and the positive and negative outputs of second signature circuit 510 are connected to the input of second DC/DC converter 520. First and second DC/DC converters 520 are effectively connected in parallel. The positive output of first DC/DC converter 520 is connected through first diode 560 to the positive power input of control circuit 530. The negative output of first DC/DC converter 520 is connected through first current sensor 550 to the negative power input of control circuit 530. The positive output of second DC/DC converter 520 is connected through second diode 560 to the positive power input of control circuit 530. The negative output of second DC/DC converter 520 is connected through second current sensor 550 to the negative power input of control circuit 530. The sense output of first current sensor 550 is connected to a first input of current share circuit 540, and the sense output of second current sensor 550 is connected to a second input of current share circuit 540.

A power sense lead is connected between the output of first DC/DC converter 520 and control circuit 530, and a power sense lead is connected between the output of second DC/DC converter 520 and control circuit 530. The control output of current share circuit 540 is fed as control inputs to first and second DC/DC converter 520. Positive output 534 and negative power output 536 of control circuit 530 represent the output of power combiner 220 and are connected to Hi-PD 250.

In operation, first and second signature circuit 510 function in all respects in the manner described above in relation to FIG. 3a and FIG. 4. First and second DC/DC converters 520 function to convert the DC power delivered from first and second PSE 40 of FIGS. 2a, 2d or first and second output of PSE 310 of FIGS. 2b, 2c to the required operating voltage of Hi-PD 250. In an exemplary embodiment, approximately 48 Volts appear between positive input 230 and negative input 235, approximately 48 Volts appear between positive input 240 and negative input 245 and Hi-PD 250 is preferably powered by 12V DC. Thus, in the exemplary embodiment, first and second DC/DC converters 520 are each 48V to 12V DC converters known to those skilled in the art. First and second DC/DC converters 520 are preferably of the isolated type, such as a flyback converters, in order to meet isolation needs between the inputs 230, 235 and 240, 245 respectively, and outputs 534, 536 of power combiner 220. Furthermore, isolated DC/DC converters 520 are advantageous when utilized in network configuration 200 of FIG. 2a and network configuration 400 of FIG. 2d wherein power is supplied by both endpoint PSE 40 and midspan PSE 40. Non-isolated topologies, such as a buck DC/DC converter, are advantageously simpler and thus lower in cost, and are preferably utilized when isolation is not required.

Current share circuit 540 functions in cooperation with current sensors 550 and 560 to sense the difference in current supplied by first and second DC/DC converters 520 to control circuit 530 and ultimately to Hi-PD 250. In a preferred embodiment, current sensors 550 and 560 are constituted of sense resistors. The sensed difference is then applied as feedback to first and second DC/DC converters 520 so as to maintain a near even balance between the current supplied by first and second DC/DC converters 520. In an exemplary embodiment the feedback provided by current share circuit 540 modifies a PWM or resonance controller in DC/DC converter 520.

Control circuit 530 functions to ensure that Hi-PD 250 does not receive power from first and second DC/DC converters 520 until both DC/DC converters 520 have stabilized at their normal operating voltage. A further preferred function of control circuit 530 is to provide hot start current limiting, thus preventing an overload of either of first and second DC/DC converters 520 during the initial inrush current of Hi-PD 250. A further preferred function of control circuit 530 is to remove power from Hi-PD 250 in the event of a shut down of one of first and second DC/DC converters 520. It is to be understood that shut down of a DC/DC converter 520 may occur due to a failure of DC/DC converter 520, or due to a disconnect of power to the DC/DC converter 520 by PSE 40 of FIGS. 2a, 2d or PSE 310 of FIGS. 2b, 2c. A further preferred function of control circuit 530 is to protect power combiner 220 in the event of a short circuit condition across the output leads of power combiner 220. Preferably, control circuit 530 functions in the event of an overcurrent condition to disconnect the combined output of first and second DC/DC converters 520 for a pre-determined period of time. Optionally, in a manner that will be explained further below, after expiration of the pre-determined period of time, power is reconnected for a short trial period to test if the short circuit still exists. In another embodiment (not shown) control circuit 530 upon sensing an overcurrent condition shuts down the operation of first and second DC/DC converters 520.

In one preferred embodiment, control circuit 530 further functions during an overload caused by Hi-PD 250, to turn off power to Hi-PD 250. In a first exemplary embodiment this function is a result of the action of at least one PSE 40 of FIGS. 2a, 2d or at least on output of PSE 310 of FIGS. 2b, 2c, the overload condition having been passed through control circuit 530 to first and second DC/DC converters 520 to PSE 40 of FIGS. 2a, 2d or PSE 310 of FIGS. 2b, 2c. In a second exemplary embodiment this function is operative due to the voltage drop at the output of the combination of first and second DC/DC converters 520, and control circuit 530 senses an under voltage condition thus initiating a shutdown.

In one preferred embodiment, control circuit 530 further comprises hysteresis to allow for inrush current to Hi-PD 250 without triggering an overload condition. In another preferred embodiment, Hi-PD 250 has low power functionality and full power functionality. In this embodiment, control circuit 530 signals Hi-PD 250 to be at low power mode, and control circuit 530 supplies power when only one of first and second DC/DC converters 520 is operating. It is to be understood that in this embodiment, Hi-PD 250 will receive low power which will typically only suffice for critical functionality.

Figure 3C:
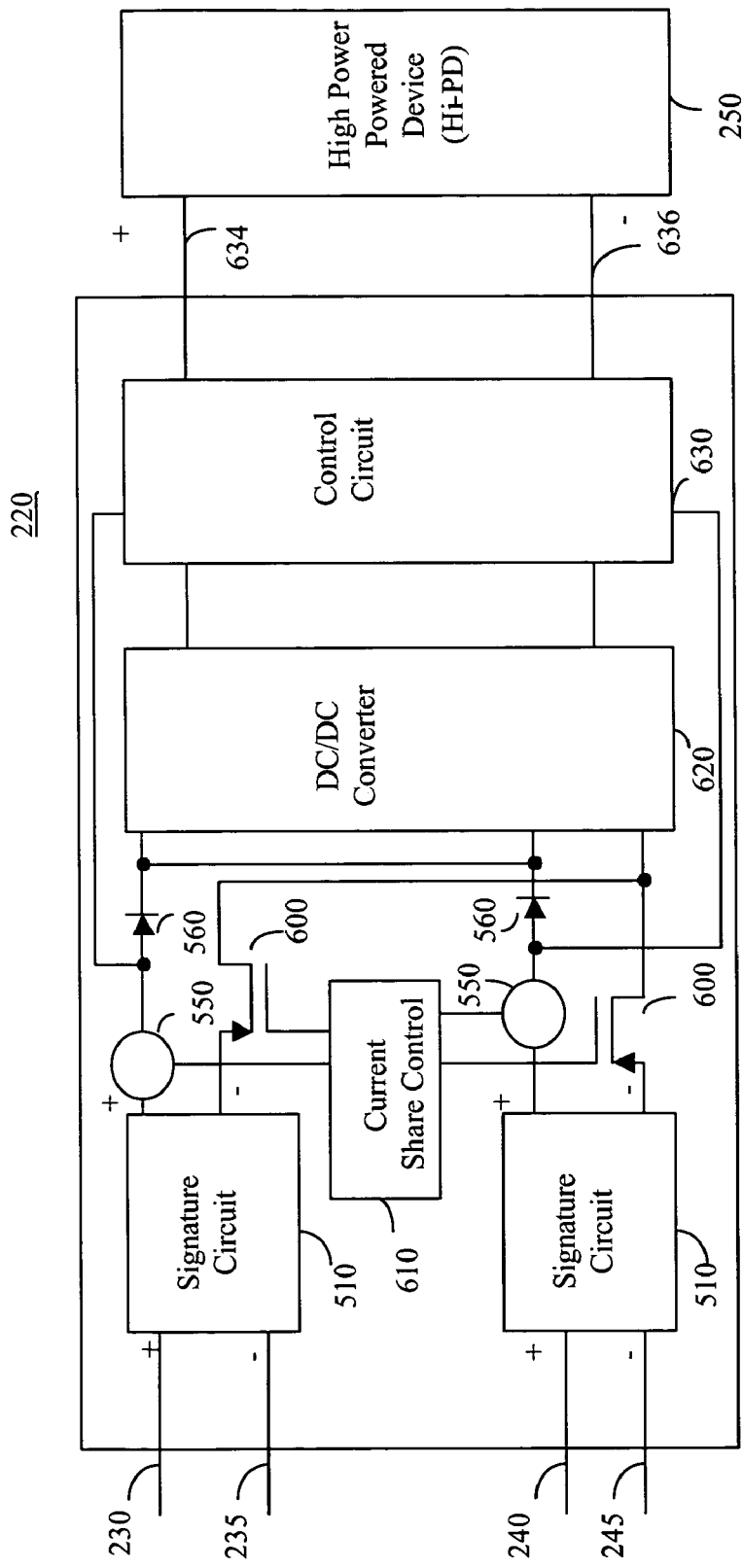
FIG. 3c illustrates a high level block diagram of a third embodiment of a power combiner according to the principle of the current invention.

FIG. 3c illustrates a high level block diagram of a third embodiment of a power combiner 220 according to the principle of the current invention comprising first power input having positive lead 230 and negative lead 235, second power input having positive lead 240 and negative lead 245, first and second signature circuits 510, first and second current sensors 550, first and second diodes 560, first and second power FET 600, current share circuit 610, DC/DC converter 620 and control circuit 630 having positive power output 634 and negative power output 636. First positive and negative power input leads 230, 235 respectively, are connected to the input of first signature circuit 510. Second positive and negative power input leads 240, 245 respectively, are connected to the input of second signature circuit 510. The positive power output of each of first second signature circuit 510 is connected through first and second current sensor 550 and first and second diode 560, respectively, to the positive power input of DC converter 620. The negative power output of each of first and second signature circuit 510 are connected through first and second power FET 600, respectively, to the negative power input of DC/DC converter 620. The sense output of each of first and second current sensor 550 is connected to a first and second sense input, respectively, of current share control 610. The output of each of first and second current sensor 550 are preferably connected to a first and second sense input, respectively of control circuit 630. A first control output of current share control 610 is connected to the gate input of first power FET 600 and a second control output of current share control 610 is connected to the gate input of second power FET 600. The positive and negative outputs of DC/DC converter 620 are connected to control circuit 630. Positive output 634 and negative output 636 of control circuit 630 represents the output of power combiner 220 and are connected to Hi-PD 250.

In operation, first and second signature circuit 510 function in all respects in the manner described above in relation to FIG. 3a and FIG. 4. It is to be noted that the embodiment of FIG. 3c presents a common ground between first and second power inputs, and thus the architecture of FIGS. 2a and 2d, in which power is supplied from two different modules is discouraged.

Current share control 610 operates in cooperation with first and second current sensors 550 to balance the current flow through first and second power FET 600. In a preferred embodiment, first and second current sensors 550 comprise sense resistors. DC/DC converter 620 functions to convert the DC power delivered from first and second output of PSE 310 of FIGS. 2b, 2c to the required operating voltage of Hi-PD 250. In an exemplary embodiment, approximately 48 Volts appear between positive input 230 and negative input 235, approximately 48 Volts appear between positive input 240 and negative input 245 and Hi-PD 250 is preferably powered by 12V DC. Thus, in the exemplary embodiment, DC/DC converter 620 is a 48V to 12V DC converters known to those skilled in the art.

Control circuit 630 functions to ensure that Hi-PD 250 does not receive power from DC/DC converter 520 until voltage is sensed at the output of each of first and second current sensors 550. A further preferred function of control circuit 630 is to provide hot start current limiting, thus preventing an overload DC/DC converters 620 during the initial inrush current of Hi-PD 250. A further preferred function of control circuit 630 is to remove power from Hi-PD 250 in the event of a disconnect of power to DC/DC converter 620 by one output of PSE 310 of FIGS. 2b, 2c. A further preferred function of control circuit 530 is to protect power combiner 220 in the event of a short circuit condition across the output leads of power combiner 220. Preferably, control circuit 530 functions to disconnect the output of DC/DC converters 620 for a pre-determined period of time. Optionally, in a manner that will be explained further below, after expiration of the pre-determined period of time, power is reconnected for a short trial period to test if the short circuit still exists.

In one preferred embodiment, control circuit 630 further functions during an overload caused by Hi-PD 250, to turn off power to Hi-PD 250. In a first exemplary embodiment this function is a result of the action of at least one output of PSE 310 of FIGS. 2b, 2c, the overload condition having been passed through control circuit 630 to DC/DC converters 620 to PSE 310 of FIGS. 2b, 2c. In a second exemplary embodiment this function is operative due to the voltage drop at the output of DC/DC converter 620, and control circuit 530 senses an under voltage condition thus initiating a shutdown.

In one preferred embodiment, control circuit 630 further comprises hysteresis to allow for inrush current to Hi-PD 250 without triggering an overload condition. In another preferred embodiment, Hi-PD 250 has low power functionality and full power functionality. In this embodiment, control circuit 630 signals Hi-PD 250 to be at low power mode, and control circuit 630 supplies low power when sufficient voltage is detected at the output of only one of first and second current sensors 550 in a manner that we explained further hereinto below. It is to be understood that in this embodiment, Hi-PD 250 will receive low power and low voltage, which will typically only suffice for critical functionality.

Figure 3D:
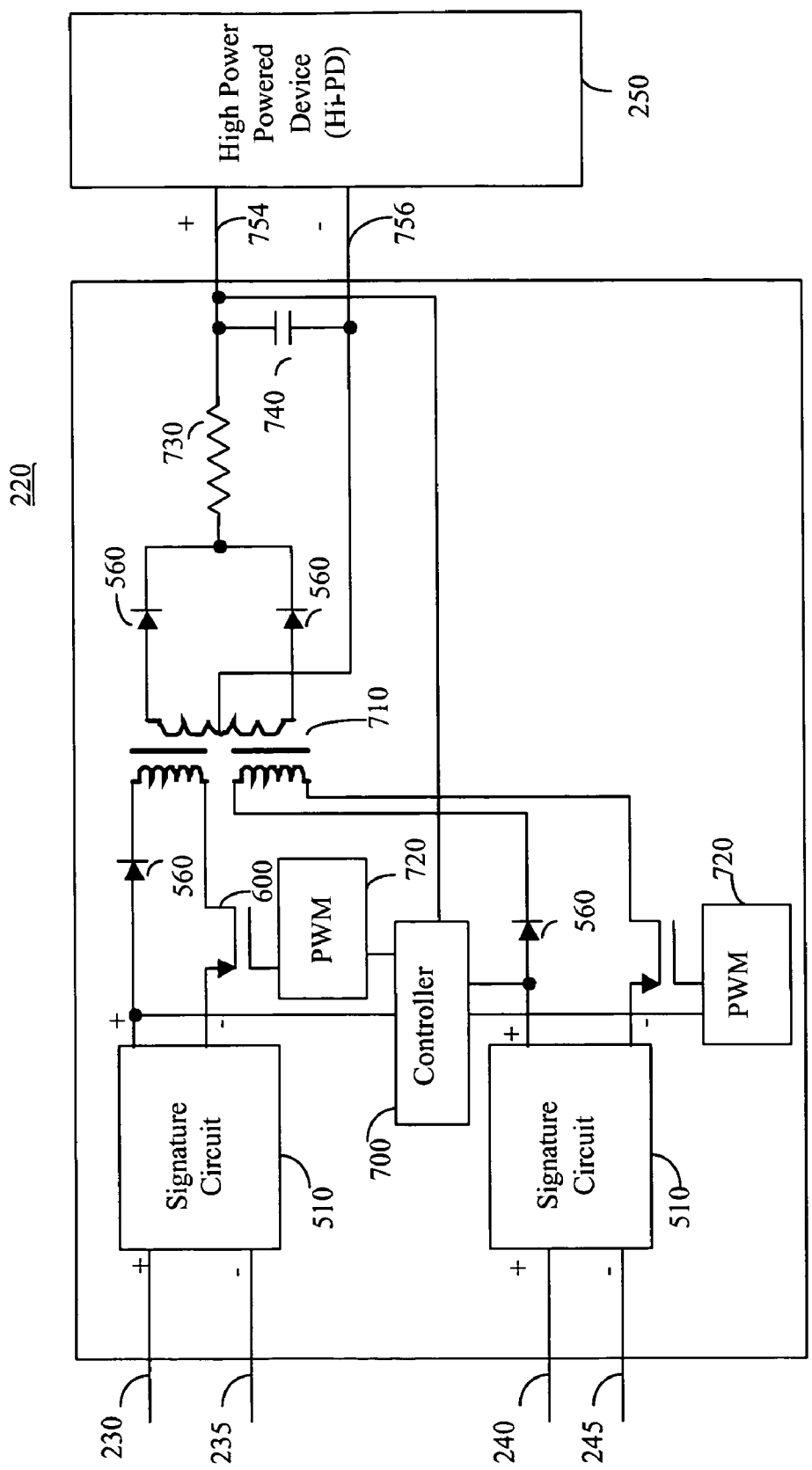
FIG. 3d illustrates a high level block diagram of a fourth embodiment of a power combiner according to the principle of the current invention

FIG. 3d illustrates a high level block diagram of a fourth embodiment of a power combiner 220 according to the principle of the current invention comprising: first power input having positive lead 230 and negative lead 235; second power input having positive lead 240 and negative lead 245; first and second signature circuits 510; first, second, third and fourth diodes 560; first and second power FET 600; controller 700; transformer 710 having first and second primaries and a single center tapped secondary; first and second PWM/resonance controller 720; resistor 730 and capacitor 740 having positive power output 754 and negative power output 756.

First positive and negative power input leads 230, 235 respectively, are connected to the input of first signature circuit 510. Second positive and negative power input leads 240, 245 respectively, are connected to the input of second signature circuit 510. The positive power outputs of first and second signature circuit 510 are each respectively connected through first and second diode 560 to one end of the first and second primaries of transformer 710. The positive power outputs of first and second signature circuit 510 are respectively further connected to sense inputs of controller 700. The negative power outputs of first and second signature circuits 510 are each respectively connected through power FET 600 to the second end of the first and second primaries of transformer 710. The gates of first and second power FET 600 are respectively connected to the output of first and second PWM/resonance controller 720. First and second PWM/resonance controllers 720 are respectively connected to outputs of controller 700.

The first and second ends of the secondary of transformer 710 are respectively connected through third and fourth diode 560 to a first end of resistor 730. The second end of resistor 730 is connected as a feedback to controller 700, to one end of capacitor 740 and serves as positive output 754 or combiner 220. The center tap of the secondary of transformer 710 is connected to the second end of capacitor 740 and serves as negative output 756 of combiner 220.

In operation, first and second signature circuit 510 function in all respects in the manner described above in relation to FIG. 3a and FIG. 4. It is to be noted that the embodiment of FIG. 3d presents a common ground between first and second power inputs, and thus the architecture of FIGS. 2a and 2d, in which power is supplied from two different modules is discouraged. However, similar isolated configurations suitable for use with the architectures of FIGS. 2a and 2d are known to those skilled in the art and do not exceed the scope of the invention. In particular it is to noted that isolation allowing for different grounds between the input and output can be accomplished utilizing isolating elements in the voltage and current feedback connection.

Controller 700 operates in cooperation with first and second sense points of the power output of first and second signature circuits 510, and the current and voltage feedback connection to balance the current flow through first and second power FET 600. Controller 700 further operates to control the timing of first PWM/resonance controller 720 so as to jointly power the attached load.

Optionally (not shown) a control circuit similar to control circuit 630 of FIG. 3c may be placed at the output of the circuitry of FIG. 3d to supply added functionality. Preferably, the control circuit is further connected to controller 700 to operative control first and second PWM/resonance controllers 720.

It is to be understood that power combiner 220 of FIGS. 3a-3d are in an exemplary embodiment co-located within Hi-PD 250. It is also to be understood that power combiner 220 of each of FIGS. 3a-3d is suitable for indoor or outdoor usage, provided the appropriate lightning and surge protection mechanisms, known to those skilled in the art, are provided. Hi-PD 250 is an exemplary embodiment an IP camera having pan, tilt and zoom capabilities. As indicated above, such an IP camera is available for indoor or outdoor usage. In another exemplary embodiment, Hi-PD 250 is a cellular base station. In another embodiment Hi-PD 250 is a wireless access point, laptop computer, desk top computer or an entrance control.

Figure 5A:
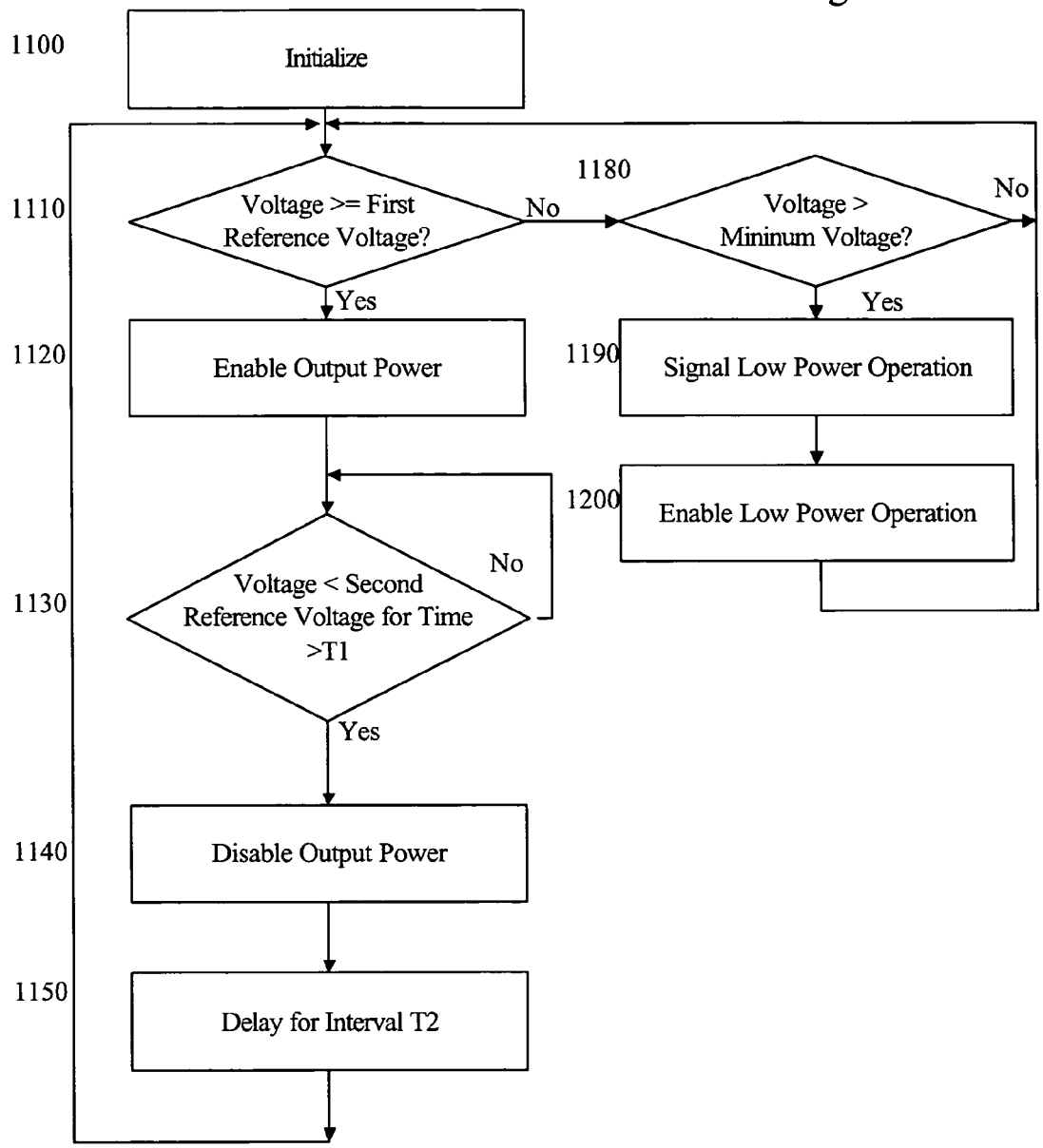

FIG. 5a illustrates a high level flow chart of the operation of control circuit 530 of FIG. 3a. In stage 1100, initialization is accomplished, and first, second and minimum reference voltages are loaded. In stage 1110, the input voltage is compared to the first reference voltage loaded in stage 1100. In the event that the input voltage is equal to or greater than the first reference voltage, in stage 1120 output power is enabled. In stage 1130, the input voltage is compared to the second reference voltage loaded in stage 1100. In a preferred embodiment the second reference voltage is lower than the first reference voltage thus providing hysteresis and enabling inrush current in excess of steady state current without shutting down output power. In the event that in stage 1130 the input voltage is not less than the second reference voltage for a first interval, denoted T1, stage 1130 is repeated. Interval T1 is used to prevent transients from shutting down the output power.

In the event that in stage 1130 the input voltage is less than the second reference voltage for interval T1, in stage 1140 output power is disabled. In stage 1150 a second interval, denoted T2, is delayed, and after expiration of T2, in stage 1110 the voltage is compared to the first reference voltage. In a preferred embodiment, the interval T2 is significantly longer than T1 thus allowing only a low duty cycle in the event of a short circuit.

In the event that in stage 1110 the voltage was less than the first reference voltage, in stage 1180 the voltage is compared to the minimum reference voltage loaded in stage 1100. In the event that the voltage is less than the minimum reference voltage, stage 1110 is repeated. In the event hat in stage 1180 the voltage is above the minimum reference voltage, in stage 1190 low power operation is signaled. In stage 1200, low power operation is enabled based on the minimum reference voltage sensed in stage 1180. Following stage 1200, stage 1110 is repeated.

Figure 5B:
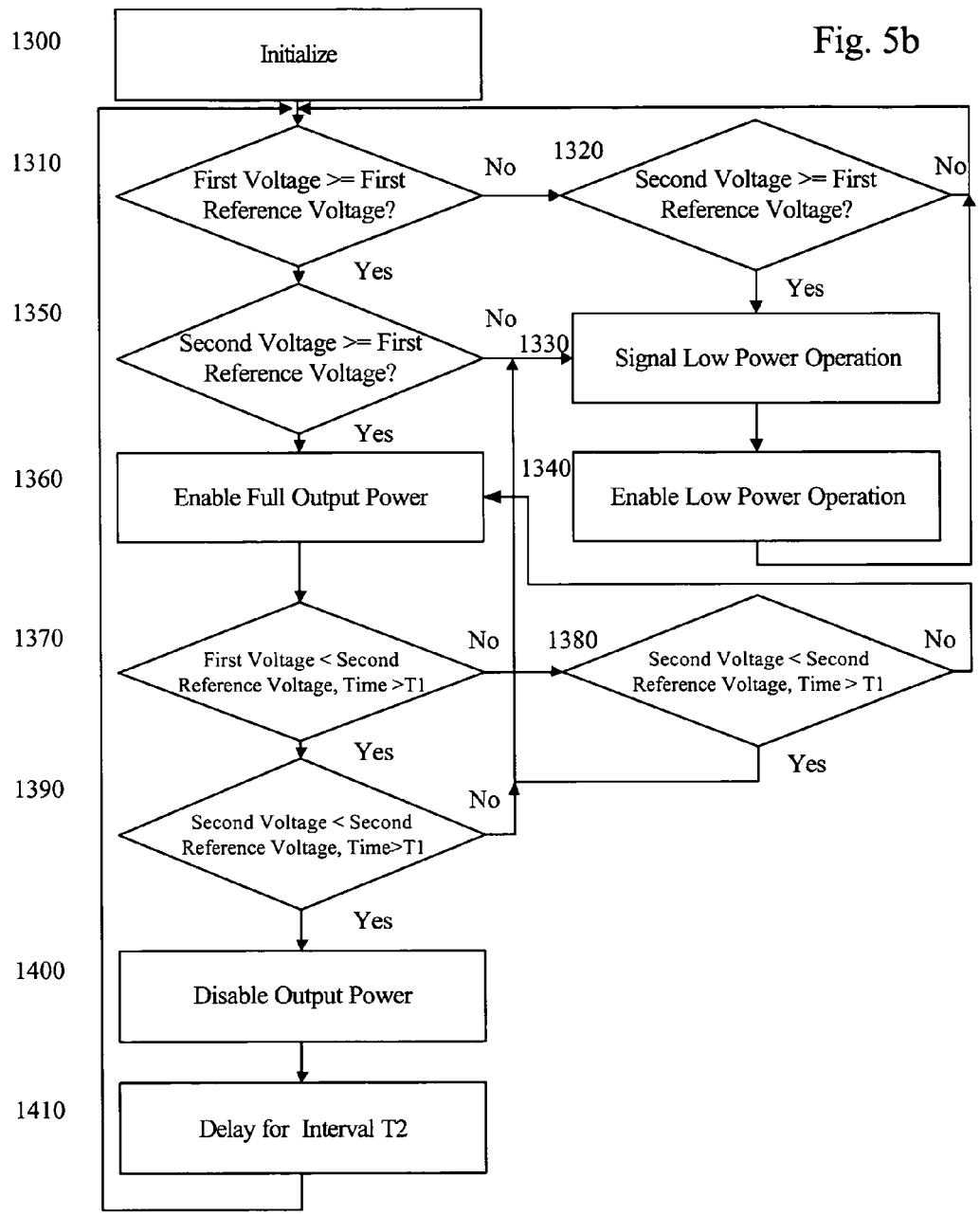
FIG. 5b illustrates a high level flow chart of a preferred operation of control circuit of FIGS. 3b-3c.

FIG. 5b illustrates a high level flow chart of the operation of control circuit 530 of FIG. 3b and control circuit 630 of FIG. 3c. In stage 1300, initialization is accomplished, and first and second reference voltages are loaded. In stage 1310, the first input voltage is compared to the first reference voltage loaded in stage 1300. In the event that the first input voltage is less than the first reference voltage, in stage 1320 the second input voltage is compared to the first reference voltage. In the event that in stage 1320 the second input voltage is equal to or greater than the first reference voltage, in stage 1330 low power operation is signaled. In stage 1340 low power operation is enabled based on the second voltage compared in stage 1320. Following stage 1340, stage 1310 is repeated.

In the event that in stage 1310 the second input voltage is less than the first reference voltage, stage 1310 is repeated as both the first and second input voltages are insufficient to support low power operation.

In the event that in stage 1310 the first input voltage is greater than or equal to the first reference voltage, in stage 1350 the second input voltage is compared to the first reference voltage. In the event that the second input voltage is less than the first reference voltage, in stage 1330 low power is signaled as a result of having a first input voltage above the first reference and the second input voltage below the first reference.

In the event that in stage 1350, the second input voltage is greater than or equal to the first reference voltage in stage 1360 full output power is enabled.

In stage 1370 the first input voltage is compared to the second reference voltage loaded in stage 1300. In a preferred embodiment the second reference voltage is lower than the first reference voltage thus providing hysteresis and enabling inrush current in excess of steady state current without shutting down output power. In the event that in stage 1370 the first input voltage is not less than the second reference voltage for a first interval, denoted T1, in stage 1380 the second input voltage is compared to the second reference voltage. In the event that the second input voltage is not less than the second reference voltage for interval T1, in stage 1360 full power is confirmed as enabled. In the event that in stage 1380 the second input voltage is less than the second reference voltage for interval T1, indicating a failure of the second input voltage, in stage 1330 low power operation is signaled. Thus, in the circumstance in which the first input voltage has been compared and found to be greater than or equal to the second reference voltage in stage 1370, and the second input voltage has been compared and found to be below the second reference voltage in stage 1370, low power operation is signaled in stage 1330 and enabled in stage 1340.

In the event that in stage 1370 the first input voltage is less than the second reference voltage for interval T1, in stage 1390 the second input voltage is compared to the second reference voltage. In the event that the second input voltage is not less than the second reference voltage for interval T1, in stage 1330 low power operation is signaled. Thus, in the circumstance in which the first input voltage has been compared and found to be less than the second reference voltage in stage 1370, and the second input voltage has been compared and found to be greater than or equal to the second reference voltage in stage 1390, low power operation is signaled in stage 1330 and enabled in stage 1340.

In the event that in stage 1390, the second input voltage is less than the second reference voltage for interval T1, in stage 1400 output power is disabled as a result of both the first and second input voltages falling below the second reference. This may be caused by an overcurrent condition such as a short circuit or a failed Hi-Pd 250. In stage 1410 a second interval, denoted T2 is delayed, and after expiration of interval T2 in stage 1310 the first input voltage is compared to the first reference voltage as above. In a preferred embodiment, interval of stage 1410 is significantly longer than interval T1 thus allowing only a low duty cycle in the event of a short circuit.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

We claim:

1. A local area network adapted to supply power to powered devices over a plurality of paths thus supplying high power, the local area network comprising:
    at least one powered device;
    a hub adapted for communicating data to and from said at least one powered device;
    a communication cabling connecting said at least one powered device to said hub, said communication cabling comprising a first set of wire pairs utilized for communicating data between said at least one powered device and said hub and a second set of wire pairs different from said first set of wire pairs;
    a first direct current power source adapted to supply and return a first direct current power over said first set of wire pairs;
    a second direct current power source adapted to supply and return a second direct current power over said second set of wire pairs; and
    a combiner operative to:
        receive said first power over said at least a portion of said first set of wire pairs;
        receive said second power over said at least a portion of said second set of wire pairs;
        combine the current of said received first power and the current of said received second power to a combined high power output;
        transmit a signal to at least one of said first power source and said second power source, said signal indicating that said combiner is operative to produce said combined high power output; and
        maintain a near even balance between the current of said received first power and the current of said received second power.

2. A local area network according to claim 1, wherein said combiner comprises a control circuit operative to sense the successful operation of said combiner, said control circuit supplying said combined high power output to said at least one powered device in response to said sensed successful operation of said combiner.

3. A local area network according to claim 2, wherein said control circuit is a controller.

4. A local area network according to claim 2, wherein said first power source and said second power source are associated with midspan power insertion equipment.

5. A local area network according to claim 4, wherein the output of said first power source is electrically isolated from the output of said second power source.

6. A local area network according to claim 4, wherein the output of said first power source is not electrically isolated from the output of said second power source.

7. A local area network according to claim 1, wherein said second set of wires are utilized for communicating data between said at least one powered device and said hub.

8. A local area network according to claim 1, wherein at least one of said first power source and said second power source are associated with midspan power insertion equipment.

9. A local area network according to claim 8, wherein said midspan power insertion equipment conforms to the IEEE 802.3af-2003 standard.

10. A local area network according to claim 1, wherein at least one of said first power source and said second power source are associated with said hub.

11. A local area network according to claim 10, wherein said at least one of said first power source and said second power source associated with said hub conforms to the IEEE 802.3af-2003 standard.

12. A local area network according to claim 1, wherein said first power source is associated with said hub, and said second power source is associated with midspan power insertion equipment.

13. A local area network according to claim 1, wherein said first power source and said second power source are associated with midspan power insertion equipment.

14. A local area network according to claim 1, wherein said first power source and said second power source are associated with said hub.

15. A local area network according to claim 1, wherein said hub adapted for communicating data to and from said at least one powered device operates according to at least one of 10 Base-T, 100 Base-T and 1000 Base-T.

16. A local area network according to claim 1, wherein said transmitted signal comprises a change in a class identification.

17. A local area network according to claim 1, wherein said combined high power output is supplied to a load.

18. A local area network according to claim 17, wherein said load comprises at least one of: a wireless access point; a laptop computer; a desk top computer; a security camera having at least one of pan, tilt and zoom functionality; and an entrance control device.

19. A local area network according to claim 17, wherein said combiner is located within said load.

20. A local area network according to claim 17, wherein said load is operative alternately in a low power mode and a high power mode, said mode selection responsive to a mode signal from said combiner.

21. A local area network according to claim 20, wherein said combiner is further operative to supply low power to said load for operation of said load in said low power mode in the absence of said combined high power.

22. A local area network according to claim 1, wherein said combiner comprises:
- a first current sensor arranged to sense the current component of said received first power;
- a second current sensor arranged to sense the current component of said received second power; and
- a current share circuit in communication with said first current sensor and said second sensor, said current share circuit operative to maintain said near even balance.

23. A local area network according to claim 1, wherein said current share circuit is implemented in a controller.

24. A combiner for use with a powered device having high power needs, the combiner comprising:
- a first power input adapted to receive a first power signal over a first set of twisted wire pairs utilized to carry communication data;
- a second power input adapted to receive a second power signal over a second set of twisted wire pairs different from said first set; and
- a circuitry arranged to combine the current of said received first power signal with the current of said received second power signal to produce a combined high power signal; and
- a control circuit operative to:
    - maintain a near even balance between the current of said received first power and the current of said received second power;
    - sense said combined high power signal;
    - supply said combined high power signal to a powered device in response to said sensed combined high power signal; and
    - in the absence of said combined high power signal, supply a low power signal to the powered device and transmit a mode signal to the powered device indicative of said supplied low power signal, the powered device operative alternately in a low power mode and a high power mode, the mode selection responsive to said mode signal.

25. A combiner according to claim 24, wherein said powered device comprises at least one of: a wireless access point; a laptop computer; a desk top computer; a security camera having at least one of pan, tilt and zoom functionality; and an entrance control device.

26. A combiner according to claim 24, wherein said combiner is located within said powered device.

27. A combiner according to claim 24, wherein said combiner is located outside of said powered device.

28. A combiner according to claim 24, wherein said control circuit is a controller.

29. A combiner according to claim 24, wherein said circuitry arranged to combine comprises at least one DC/DC converter.

30. A combiner according to claim 24, wherein said circuitry arranged to combine comprises a first DC/DC converter associated with said first power input and a second DC/DC converter associated with said second power input.

31. A combiner according to claim 30, wherein said first DC/DC converter is connected in series with said second DC/DC converter.

32. A combiner according to claim 30, wherein said first DC/DC converter is connected in parallel with said second DC/DC converter.

33. A combiner according to claim 30, wherein said circuitry arranged to combine further comprises a first PWJVI/resonance controller associated with said first DC/DC converter and a second PWM/resonance controller associated with said second DC/DC converter.

34. A combiner according to claim 24, wherein said circuitry arranged to combine further comprises a transformer having a first primary associated with said first power input and a second primary associated with said second power input.

35. A combiner according to claim 34, wherein said transformer comprises a secondary associated with said combined high power.

36. A combiner according to claim 24, further comprising:
- a first current sensor arranged to sense the current component of said received first power; and
- a second current sensor arranged to sense the current component of said received second power,
- wherein said control circuit comprises a current share circuit in communication with said first current sensor and said second sensor, said current share circuit operative to maintain said near even balance.

37. A method of supplying power to a powered device comprising the steps of:
a) receiving a first power signal over a first set of twisted wire pairs;
b) receiving a second power signal over a second set of twisted wire pairs different from said first set;
c) combining the current of said received first power signal and the current of said received second power signal into a combined high power output;
d) sensing the success of said combining of said received first power signal and said received second power signal;
e) enabling said combined high power output in response to said sensed success of said combining;
f) maintaining, in the event of said sensed success of said combining, a near even balance between the current of said received first power signal and the current of said second received power signal;
g) sensing an unsuccessful combining of said received first power signal and said received second power signal;
h) comparing at least one of said first and said second received power signal to a reference; and
i) supplying low power from one of said received first power signal and said received second power signal in response to said comparing.

38. A method of supplying power to a powered device according to claim 37, further comprising the step of:
j) transmitting a mode signal to the powered device of said supplied low power, the powered device operative in one of a high power mode and a low power mode responsive to said transmitted mode signal.

39. A method of supplying power to a powered device according to claim 37, further comprising the step of:

j) transmitting a signal to at least one of the source of said received first power signal and the source of said received second power signal, said transmitted signal notifying said at least one of the source of said received first power signal and the source of said received second power signal of said combining.

40. A method of supplying power to a powered device according to claim 39, wherein said transmitting a signal comprises changing a classification identification.

41. A local area network adapted to supply power to powered devices over a plurality of paths thus supplying high power, the local area network comprising:

at least one powered device;

a hub adapted for communicating data to and from said at least one powered device;

a communication cabling connecting said at least one powered device to said hub, said communication cabling comprising a first set of wire pairs utilized for communicating data between said at least one powered device and said hub and a second set of wire pairs different from said first set of wire pairs;

a first direct current power source adapted to supply and return a first direct current power over said first set of wire pairs;

a second direct current power source adapted to supply and return a second direct current power over said second set of wire pairs;

a combiner; and a load, said combiner operative to:

receive said first power over said at least a portion of said first set of wire pairs;

receive said second power over said at least a portion of said second set of wire pairs;

combine the current of said received first power and the current of said received second power to a combined high power output;

supply said combined high power output to said load;

supply low power to said load for operation of said load in said low power mode in the absence of said combined high power; and signal said load of said low power supply operation, wherein said load is operative alternately in a low power mode and a high power mode, said mode selection responsive to said signal of said combiner.

42. A local area network according to claim 41, wherein said combiner is operative to transmit a signal to at least one of said first direct current power source and said second direct current power source, said signal indicating that said combiner is operative to produce said high power output.

43. A local area network according to claim 42, wherein said transmitted signal comprises a change in a class identification.

44. A combiner for use with a powered device having high power needs, the combiner comprising:

a first power input adapted to receive a first power signal from a first power source over a first set of twisted wire pairs utilized to carry communication data;

a second power input adapted to receive a second power signal from a second power source over a second set of twisted wire pairs different from said first set; and a circuitry arranged to combine the current of said received first power signal with the current of said received second power signal to produce a combined high power signal; and a control circuit operative to:

sense said combined high power signal;

supply said combined high power signal to a powered device in response to said sensed combined high power signal; and transmit a signal to at least one of the first power source and the second power source, said transmitted signal indicating that the combiner is operative to supply said combined high power signal.

45. A combiner according to claim 44, wherein said control circuit is further operative in the absence of said combined high power signal, to:

supply a low power signal to the powered device; and transmit a mode signal to the powered device indicative of said supplied low power signal, the powered device operative alternately in a low power mode and a high power mode, the mode selection responsive to said transmitted mode signal.

46. A method of supplying power to a powered device, the method comprising:

a) receiving a first power signal over a first set of twisted wire pairs;

b) receiving a second power signal over a second set of twisted wire pairs different from said first set;

c) combining the current of said received first power signal and the current of said received second power signal into a combined high power output;

d) sensing the success of said combining of said received first power signal and said received second power signal;

e) supplying said combined high power output to a powered device in response to said sensed success of said combining;

g) sensing an unsuccessful combining of said received first power signal and said received second power signal;

h) supplying low power from one of said received first power signal and said received second power signal to the powered device in response to said sensed unsuccessful combining; and i) transmitting a mode signal to the powered device indicative of the status of said combining, the powered device operative in one of a high power mode and a low power mode responsive to said transmitted mode signal.

47. A method according to claim 46, further comprising:

j) transmitting a signal to at least one of the source of said received first power signal and the source of said received second power signal, said transmitted signal notifying said at least one of the source of said received first power signal and the source of said received second power signal of said combining.

48. A method of supplying power to a powered device comprising the steps of:

a) receiving a first power signal over a first set of twisted wire pairs;

b) receiving a second power signal over a second set of twisted wire pairs different from said first set;

c) combining the current of said received first power signal and the current of said received second power signal into a combined high power output;

d) sensing the success of said combining of said received first power signal and said received second power signal;

e) supplying said combined high power output to a powered device in response to said sensed success of said combining; and f) transmitting a signal to at least one of the source of said received first power signal and the source of said received second power signal, said transmitted signal notifying said at least one of the source of said received first power signal and the source of said received second power signal of said combining.

49. A method according to claim 48, further comprising:

g) sensing an unsuccessful combining of said received first power signal and said received second power signal;

h) supplying low power from one of said received first power signal and said received second power signal to the powered device in response to said sensed unsuccessful combining; and i) transmitting a mode signal to the powered device indicative of the status of said combining, the powered device operative in one of a high power mode and a low power mode responsive to said transmitted mode signal.

* * * * *

UNITED STATES PATENT AND TRADEMARK OFFICE
CERTIFICATE OF CORRECTION

PATENT NO. : 7,492,059 B2 Page 1 of 1
APPLICATION NO. : 10/761327
DATED : February 17, 2009
INVENTOR(S) : Arkadiy Peker et al.

It is certified that error appears in the above-identified patent and that said Letters Patent is hereby corrected as shown below:

Column 22, (Claim 1), line 2 to read - receive said first power "over at least" a portion of said Column 22, (Claim 1), line 4 to read - receive said second power "over at least" a portion of Column 23, (Claim 23), line 27 to read - A local area network according to "claim 22"

Column 24, (Claim 33), line 15 - 16 to read - further comprises a first "PWM/resonance controller"

Column 25, (Claim 41), line 35 to read - receive said first power "over at least" a portion of said Column 25, (Claim 41), line 37 to read - receive said second power "over at least" a portion of Signed and Sealed this Twelfth Day of May, 2009

JOHN DOLL
*Acting Director of the United States Patent and Trademark Office*